(12) United States Patent
Hiramatsu et al.

(10) Patent No.: US 7,831,744 B2
(45) Date of Patent: Nov. 9, 2010

(54) STORAGE SYSTEM AND OWNERSHIP TRANSFER METHOD

(75) Inventors: Shinichi Hiramatsu, Odawara (JP); Hisaharu Takeuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 271 days.

(21) Appl. No.: 12/192,251

(22) Filed: Aug. 15, 2008

(65) Prior Publication Data
US 2009/0307385 A1 Dec. 10, 2009

(30) Foreign Application Priority Data
Jun. 6, 2008 (JP) .............................. 2008-149895

(51) Int. Cl.
*G06F 3/00* (2006.01)
*G06F 5/00* (2006.01)

(52) U.S. Cl. .............................. 710/21; 710/20; 710/36; 710/37

(58) Field of Classification Search .................... 710/20, 710/21, 36, 37
See application file for complete search history.

(56) References Cited

U.S. PATENT DOCUMENTS 6,675,268 B1 * 1/2004 DeKoning et al. .......... 711/151

2005/0210188 A1 * 9/2005 Mizuno et al. .............. 711/112

FOREIGN PATENT DOCUMENTS

JP 2005-267545 9/2005
JP 2007-113449 5/2007

OTHER PUBLICATIONS

U.S. Appl. No. 12/018,818, filed Jan. 24, 2008, Serizawa.

* cited by examiner

*Primary Examiner*—Alford W Kindred
*Assistant Examiner*—David E Martinez
(74) *Attorney, Agent, or Firm*—Brundidge & Stanger, P.C.

(57) ABSTRACT

A storage system that includes: a plurality of microprocessors; a plurality of storage areas to be formed to a drive group; an assignment section that assigns, to each of the microprocessors, an ownership of accessing any of the storage areas; a management section that manages, as an operating ratio, a proportion of a time to be taken for each of the microprocessors to execute a request issued to each of the storage areas; a search section that searches, for transferring the ownership assigned to an arbitrary one of the microprocessors to any of the another microprocessor determined based on the operating ratio, one or more of the storage areas under the ownership of the arbitrary microprocessor for a transfer-target storage area; and a transfer section that transfers, to the another microprocessor, the ownership of the transfer-target storage area that is assigned to the arbitrary microprocessor. The resulting storage system can make full use of the performance capabilities of a storage device, and an ownership transfer method can be provided.

10 Claims, 34 Drawing Sheets

FIG. 14

| TYPE OF TRANSFER UNIT | OPERATING RATIO |
|---|---|
| LOGIC SET | (TOTAL OPERATING RATIO OF LOGIC DEVICE GROUP(S)) + (TOTAL OPERATING RATIO OF PHYSICAL SET(S) BELONGING TO LOGIC DEVICE GROUP) |
| PHYSICAL SET | (TOTAL OPERATING RATIO OF PHYSICAL DEVICE GROUP(S)) + (TOTAL OPERATING RATIO OF LOGIC DEVICE(S) BELONGING TO PHYSICAL DEVICE GROUP) |
| LOGIC DEVICE | OPERATING RATIO OF LOGIC DEVICE(S) |

FIG. 26

```
                                              S
%MPPK    ~C1

MPPK#    OPERATING RATIO ⎫
  0          56%         ⎪
  1          45%         ⎬ S1
  2          89%         ⎪
  3          12%         ⎭

%MOVEOWNER  ~C2
DESIGNATE MPPK# FOR OWNERSHIP TRANSFER ~M1
2

SELECT TRANSFER UNIT FOR TRANSFER ~M2
1:LDEV-G    2:PDEV-G    3:LDEV
3
ESTIMATION OPERATING RATIOS AFTER  ~M3
OWNERSHIP TRANSFER ARE AS BELOW

MPPK#    OPERATING RATIO ⎫
  0          56%         ⎪
  1          45%         ⎬ S2
  2          50%         ⎪
  3          50%         ⎭

TRANSFER?    Y/N  ~M4
Y

TRANSFER COMPLETED  ~M5

%MPPK
MPPK#    OPERATING RATIO ⎫
  0          54%         ⎪
  1          47%         ⎬ S3
  2          51%         ⎪
  3          49%         ⎭
```

FIG. 29

```
%MPPK        ~C3
MPPK#    OPERATING RATIO ⎫
  0          56%         ⎪
  1          45%         ⎬ S4
  2          89%         ⎪
  3          12%         ⎭

%MOVEOWNER-A  ~C4

DESIGNATE MPPK# FOR OWNERSHIP TRANSFER  ~M6
2

SELECT TRANSFER TARGET  ~M7
1:PDEV-G   2:LDEV-G   3:LDEV
3

OPERATING STATUS OF LOGIC DEVICE MPPK2 ⎫
LDEV#    OPERATING RATIO               ⎪
 0002        20%                       ⎬ S5
 0201         5%                       ⎪
 0420         2%                       ⎭

DESIGNATE TRANSFER LOGIC DEVICE  ~M8
0002

DESIGNATE TRANSFER MPPK#  ~M9
3

TRANSFER?    Y/N   ~M10
Y

TRANSFER COMPLETED  ~M11

%MPPK
MPPK#    OPERATING RATIO ⎫
  0          54%         ⎪
  1          47%         ⎬ S6
  2          79%         ⎪
  3          32%         ⎭
```

STORAGE SYSTEM AND OWNERSHIP TRANSFER METHOD

CROSS REFERENCE TO RELATED APPLICATIONS

This application relates to and claims priority from Japanese Patent Application No. 2008-149895 filed on Jun. 6, 2008, the entire disclosure of which is incorporated herein by reference.

BACKGROUND

A storage device is configured by a controller group and a drive group, and manages a plurality of physical devices by RAID (Redundant Array of Independent/Inexpensive Disks). The controller group is the one controlling input/output of data to/from the storage device, and the drive group is the one configured by a plurality of physical devices for storage of the data. These physical devices offer a physical storage area, on which at least one or more logic volumes (hereinafter, referred to as logic devices) are formed.

In the controller group, a shared memory for use of temporary data storage is often configured separately from a plurality of microprocessors in charge of control over data input/output. The microprocessors are each connected with a local memory storing a storage-device operating program to be run by the microprocessors, control information, and others. With such a configuration, however, the time taken for the microprocessors to access the shared memory is longer than the time taken to access the local memory, i.e., several to several hundred times longer. Another concern is the shared use of the shared memory by the microprocessors, and for data input/output by the microprocessors, any of the microprocessors making access to the shared memory has to lock, access, and unlock the shared memory to prevent the remaining microprocessors from making access to the shared memory. If a plurality of microprocessors use the same shared memory as such, the processing time of making access to the shared memory takes very long.

In consideration thereof, Patent Document 1 (JP-A-2005-267545) describes a technology for reducing the frequency of accessing the shared memory. To be specific, in a storage device incorporated with a controller group in which a shared memory is configured separately from a plurality of microprocessors, the controller group makes an assignment of ownership to any selected microprocessor. After such an assignment of ownership, only the microprocessor assigned the ownership is allowed to perform the processing of data input/output with respect to an arbitrary logic device. Moreover, accessing information of the arbitrary logic device stored in the share memory is also allowed only to the microprocessor assigned the ownership. As such, because only any selected microprocessor is allowed to access information of an arbitrary logic device, if such information is once acquired from the shared memory for storage on the local memory, the shared memory is not necessarily accessed again.

With the technology of Patent Document 1, considering only the load conditions of an arbitrary logic device to be processed by the ownership-assigned microprocessor, the controller group is in charge of ownership transfer. That is, no consideration is given to the correlation among various factors related to the storage device, e.g., the correlation between the arbitrary logic device and any other logic devices, and the correlation between the processing of data input/output and any other processing. As a result, for the control group to transfer the ownership of the arbitrary logic device, communications take time between the ownership-transfer-source microprocessor to an ownership-transfer-destination microprocessor, and thus the load to be imposed on these microprocessors is instead increased. This thus causes a problem that, although the storage device is incorporated with a plurality of microprocessors for the purpose of high-speed processing, the performance capabilities thereof are instead reduced.

SUMMARY

In consideration thereof, the invention proposes a storage system that can fully make use of the performance capabilities of a storage device, and an ownership transfer method.

In order to achieve such an object, a first aspect of the invention is characteristically directed to a storage system that includes: a plurality of microprocessors; a plurality of storage areas to be formed to a drive group configured by a plurality of physical drives; an assignment section that assigns, to each of the microprocessors, an ownership of accessing any of the storage areas; a management section that manages, as an operating ratio, a ratio of time to be taken for each of the microprocessors to execute a request issued to each of the storage areas; a search section that searches, for transferring the ownership assigned to an arbitrary one of the microprocessors to any of the other microprocessors determined based on the operating ratio, one or more of the storage areas under the ownership of the arbitrary microprocessor for a transfer-target storage area; and a transfer section that transfers, to the other microprocessor, the ownership corresponding to the transfer-target storage area.

A second aspect of the invention is characteristically directed to an ownership transfer method that includes the steps of: assigning, to each of a plurality of microprocessors, an ownership of accessing any of a plurality of storage areas formed to a drive group configured by a plurality of physical drives; managing, as an operating ratio, a ratio of time to be taken for each of the microprocessors to execute a request issued to each of the storage areas; searching, for transferring the ownership assigned to an arbitrary one of the microprocessors to any of the other microprocessors determined based on the operating ratio, one or more of the storage areas under the ownership of the arbitrary microprocessor for a transfer-target storage area; and transferring, to the other microprocessor, the ownership corresponding to the transfer-target storage area.

BRIEF DESCRIPTION OF THE DRAWINGS

FIG. 14 is a chart showing operating ratios of the transfer units in the embodiment;

FIG. 26 is a screen view showing the ownership transfer process to be executed on a transfer unit basis based on the user designation;

FIG. 29 is a screen view showing the ownership transfer process based on the transfer target designated by the user;

DETAILED DESCRIPTION

In the below, an embodiment of the invention is described in detail by referring to the accompanying drawings.

1. Configuration of Storage System

Figure 1:
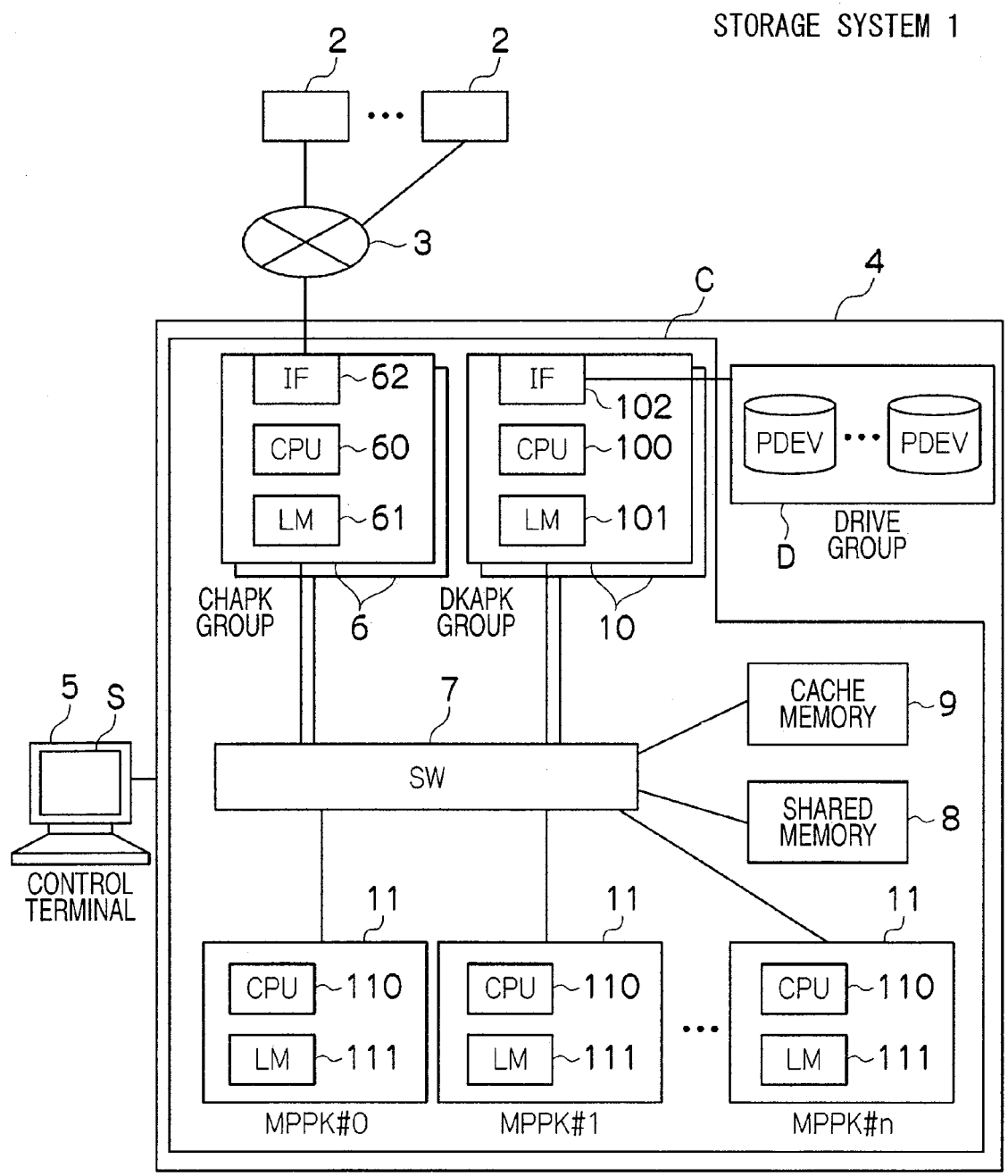
FIG. 1 is a block diagram showing the configuration of a storage system in an embodiment.

In FIG. 1, a reference numeral 1 denotes a storage system in its entirety in the embodiment. In this storage system 1, a host device 2 is connected to a storage device 4 over a network 3, and the storage device 4 is connected with a control terminal.

The host device 2 is a computer device provided with information processing resources such as CPU (Central Processing Unit) (not shown), and a memory (not shown). The host device 2 issues a request for the storage device 4 to make it perform data input/output, for example.

The network 3 is exemplified by an SAN (Storage Area Network), LAN (Local Area Network), the Internet, a public line, a dedicated line, and others. When the network 3 is the SAN, a fiber channel protocol is used as a basis, and when the network 3 is the LAN, TCP/IP (Transmission Control Protocol/Internet Protocol) is used as a basis. The network 3 in this embodiment is the SAN.

The storage device 4 is configured to include a drive group D and a controller group C. The drive group D is configured by a plurality of physical devices (denoted as PDEV in the drawing), and the controller group C serves to manage a plurality of physical devices by RAID. The physical device PDEV is configured by an SCSI (Small Computer System Interface) disk or others being expensive with a high access performance, or by an SATA (Serial Advanced Technology Attachment) disk, an optical disk, or others being inexpensive with a low access performance, for example.

The controller group C is configured to include a plurality of channel adaptors (denoted as CHAPK group in the drawing) 6, a switch 7, a shared memory 8, a cache memory 9, a plurality of disk adaptors (denoted as DKAPK group in the drawing) 10, and a plurality of microprocessor packages (hereinafter, simply referred to as microprocessors; denoted as MPPK# in the drawing) 11.

The channel adaptor group is configured by a plurality of channel adaptors 6. The channel adaptors 6 are each configured to include a CPU 60, a local memory (denoted as LM in the drawing) 61, a communications interface (denoted as IF in the drawing) 62, and others. The CPU 60 controls data and input/output requests to be exchanged between the host device 2 and the storage device 4 via the communications interface 62. The local memory 61 stores therein management information and control information needed for transmission/reception of data and requests. The control information to be stored on the local memory 61 will be described later.

The switch 7 is connected to the other components, i.e., the channel adaptors 6, the shared memory 8, the cache memory 9, the disk adaptors 10, and the microprocessors 11. Among these components, i.e., the channel adaptors 6, the shared memory 8, the cache memory 9, the disk adaptors 10, and the microprocessors 11, the exchange of data and various types of requests is made via this switch 7.

The shared memory 8 is a storage memory shared by the channel adaptors 6 and the disk adaptors 10. The shared memory 8 is used for storage of, mainly, information about the system configuration, various control programs, various requests coming from the host device 2, and others. The storage contents of the shared memory 8, i.e., various tables and programs, will be described later.

The cache memory 9 is also a storage memory shared by the channel adaptor group and the disk adaptor group. The cache memory 9 is used for temporary storage of, mainly, data input/output to/from the storage device 4.

The disk adaptor group is configured by a plurality of disk adaptors 10. The disk adaptors 10 are each configured by a CPU 100, a local memory (denoted as LM in the drawing) 101, a communications interface (denoted as IF in the drawing) 102, and others. Via the communications interface 102, the CPU 100 controls input/output of data, staging requests, and destaging requests, which are all exchanged between the drive group D and the controller group C. The staging requests are those for writing the data to the physical devices PDEV, and the destaging requests are those for reading the data from the physical devices PDEV. The local memory 101 stores therein management information and control information needed for transmission/reception of data and requests.

The microprocessors 11 are each configured to include a CPU 110, and a local memory (denoted as LM in the drawing) 111. The CPU 110 controls the storage device 4 in its entirety, i.e., controls various types of requests including data input/output requests, staging requests, destaging requests, and others, and controls input/output of data. The local memory 111 stores therein management information and control information needed for control over various types of requests, and input/output of data.

The microprocessors 11 are each assigned an ownership. The ownership here denotes a right allowing only an arbitrary microprocessor 11 to access an arbitrary storage area. That is, in the first place, the remaining microprocessors 11 are not allowed to access the storage area under the ownership of the arbitrary microprocessor 11, and are also not allowed to access the control information about the storage area under the ownership of the arbitrary microprocessor 11. As such, this is different from locking of memory, i.e., excluding any access by the remaining microprocessors every time the arbitrary microprocessor accesses the arbitrary storage area. The storage areas vary in storage capacity with various devices, device groups, and others. The devices in this embodiment include physical devices and logic devices.

The microprocessors 11 are each configured separately from the shared memory 8. Because only the microprocessor assigned an ownership is allowed to acquire information about an arbitrary logic device, if such information is once acquired from the shared memory 8 for storage on the local memory 111, the shared memory 8 is not necessarily accessed again.

The control terminal 5 is a computer device to be operated for management of the storage device 4. The control terminal 5 can be set with management information and control information about the storage device 4 via a management screen S.

2. Logic Configuration of Physical Device

Figure 2:
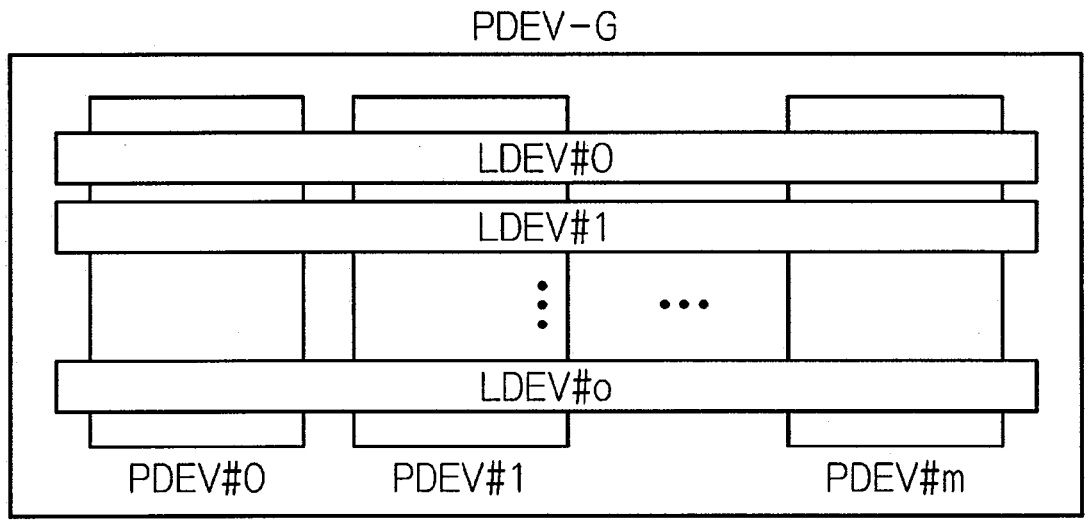
FIG. 2 is an illustration of the logic configuration of a physical device in the embodiment.

In the storage system 1 of this embodiment, as shown in FIG. 2, the drive group D is provided with a plurality of physical devices PDEV. Among these physical devices PDEV, a few to several physical devices PDEV configure a physical device group PDEV-G (RAID group). On the storage area provided by the physical device group PDEV-G, one or more logic devices (denoted as LDEV in the drawing) are defined. The logic device(s) LDEV are each assigned a unique identifier LUN (Logic Block Number). Data input/output is performed by designating an address, which is a combination of such an identifier and a number LBA (Logic Block Addressing). The number LBA is the one uniquely assigned to every block being results of logic division inside of the logic device(s) LDEV.

3. Storage Contents of Memories

Described next are the storage contents of each of the memories.

3-1. Storage Contents of Local Memory of Channel Adaptor

Figure 3:
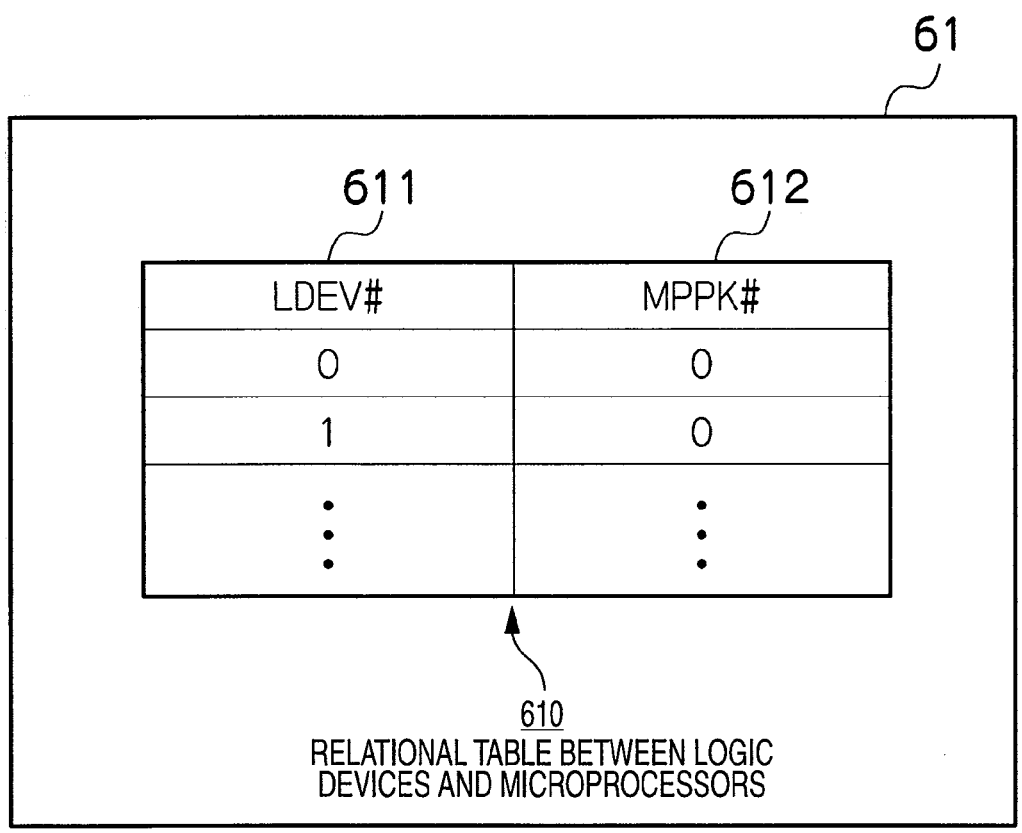
FIG. 3 is a chart of a table showing the relationship between logic devices and microprocessors.

As shown in FIG. 3, the local memory 61 of the channel adaptor 6 stores therein a table 610 showing the relationship between the logic devices and the microprocessors (hereinafter, referred to as relational table 610). The relational table 610 shows the correlation between the logic devices LDEV and the microprocessors 11 assigned the ownership of the logic devices LDEV. The relational table 610 is configured to include an "LDEV#" field 611 indicating logic device numbers, and an "MPPK#" field 612 indicating microprocessor numbers assigned the ownership of the logic devices.

Upon reception of an input/output request from the host device 2 for data stored in a certain logic device LDEV, the channel adaptor 6 refers to the relational table 610, and forwards the input/output request to the microprocessor 11 assigned the ownership of the logic device LDEV.

3-2. Storage Contents of Local Memory of Microprocessor

Figure 4:
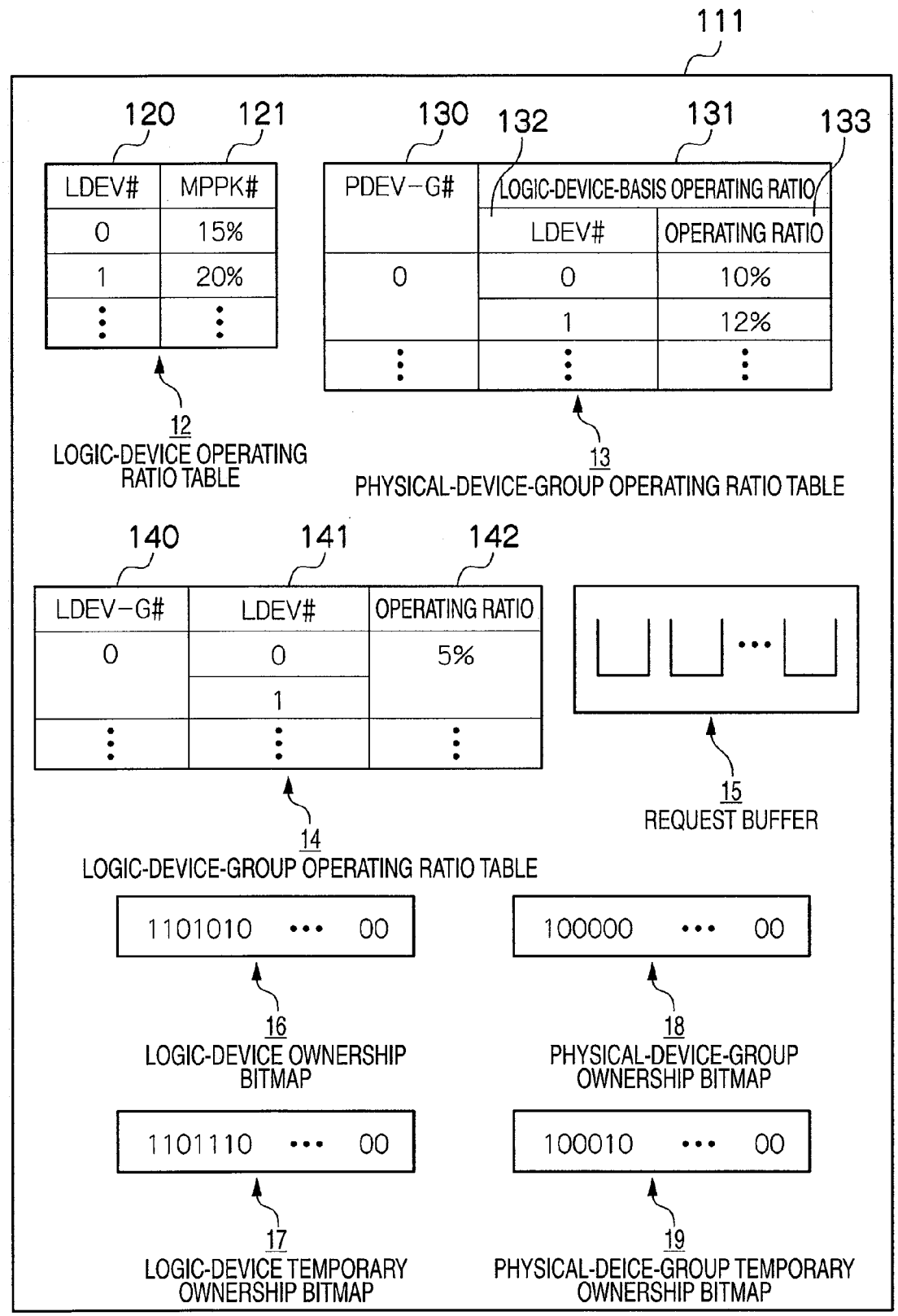
FIG. 4 is an illustration of the storage details of a local memory in the embodiment.

As shown in FIG. 4, the local memory 111 of the microprocessor 11 stores therein information about logic devices and physical devices under the ownership of the microprocessor 11. To be specific, the local memory 111 of the microprocessor 11 stores therein a logic-device operating ratio table 12, a physical-device-group operating ratio table 13, a logic-device-group operating ratio table 14, a request buffer 15, a logic-device ownership bitmap 16, a logic-device temporary ownership bitmap 17, a physical-device-group ownership bitmap 18, and a physical-device-group temporary ownership bitmap 19.

The logic-device operating ratio table 12 is provided for managing the operating status of the logic devices that process requests coming from the host device 2 or the storage device 4. The logic-device operating ratio table 12 in the embodiment shows the operating status for the logic devices LDEV to process a data input/output request coming from the host device 2. Such a request is surely not restrictive, and may serve well as long as it is issued by the host device 2 or the storage device 4 with respect to the logic devices LDEV. The logic-device operating ratio table 12 is configured to include an "LDEV#" field 120 indicating numbers of logic devices each under the ownership of the microprocessor 11, and an "operating ratio" field 121 indicating the operating ratios of the logic devices.

The operating ratios indicated in the "operating ratio" field 121 are each a calculated value of a ratio of time to be taken for the microprocessor 11 to process, in a second, a request issued by the host device 2 with respect to each of the logic devices LDEV. Assuming that the microprocessor 11 takes, in a second, 0.1 second to process a request issued by the host device 2 with respect to an arbitrary logic device LDEV, the operating ratio is 10%. Also, assuming that the microprocessor 11 takes, in a second, 0.1 second for processing of the logic device LDEV#1, and then takes 0.3 seconds thereafter, the operating ratio is 40% because the microprocessor 11 takes 0.4 seconds for such processing in a second.

The physical-device-group operating ratio table 13 is provided for managing the operating status of the physical device groups PDEV-G that process a request coming from the host device 2 or the storage device 4. The physical-device-group operating ratio table 13 in this embodiment indicates the operating status for the physical device groups PDEV-G to process a staging request or a destaging request coming from the disk adaptors 10. Such a request is surely not restrictive, and may serve well as long as it is issued by the host device 2 or the storage device 4 with respect to the physical device groups PDEV-G.

The physical-device-group operating ratio table 13 is configured to include a "PDEV-G#" field 130 indicating numbers of physical device groups each under the ownership of the microprocessor 11, and a "logic-device-basis operating ratio" field 131 indicating the operating ratios of the logic devices in each of the physical device groups PDEV-G. The "logic-device-basis operating ratio" field 131 is configured to include an "LDEV#" field 132 indicating numbers of the logic devices in each of the physical device groups PDEV-G, and an "operating ratio" field 133 indicating the operating ratios of the logic devices. The operating ratios indicated in the "operating ratio" field 133 are each a calculated value of a ratio of time to be taken for the microprocessor 11 assigned the ownership of any of the physical device groups PDEV-G to process, in a second, a staging or destaging request issued by the disk adaptors 10 with respect to each of the logic devices LDEV in the physical device group PDEV-G.

The logic-device-group operating ratio table 14 is provided for managing the operating status of logic device groups LDEV-G that process a request coming from the host device 2 or the storage device 4. The logic device-group operating ratio table 14 in the embodiment indicates the operating status for the logic device groups LDEV-G to process a copy request coming from the host device 2 or the storage device 4. Such a request is surely not restrictive, and may serve well as long as it is issued by the host device 2 or the storage device 4 with respect to the logic device groups LDEV-G.

The logic-device-group operating ratio table 14 is configured to include an "LDEV-G#" field 140, an "LDEV#" field 141, and an "operating ratio" field 142. The "LDEV-G#" field 140 indicates numbers of the logic device groups each under the ownership of the microprocessor 11, and the "LDEV#" field 141 indicates numbers of the logic devices in each of the logic device groups. The "operating ratio" field 142 indicates the operating ratios of the logic device groups. The operating ratios indicated in the "operating ratio" field 142 are each a calculated value of a ratio of time to be taken for the microprocessor 11 to process, in a second, a copy request issued by the host device 2 or the host device 4 with respect to the logic devices LDEV-G.

The request buffer 15 is a storage area for temporary storage of requests coming from the host device 2 or the storage device 4. In this embodiment, the requests are stored in the buffer on a type basis in the order of received, but this is surely not restrictive.

The logic-device ownership bitmap 16 stores therein information indicating whether or not the microprocessor 11 has an ownership with respect to an arbitrary logic device LDEV. This bitmap has entries of all of the logic devices LDEV belonging to the storage device 4, and for every logic device number, is managed to turn on a bit indicating whether or not the logic devices are each under the ownership of the microprocessor 11. In this embodiment, a bit of "1" is so set as to be turned on for the logic device(s) LDEV under the ownership of the microprocessor 11, and a bit of "0" is so set as to be turned on for the logic device(s) LDEV not under the ownership of the microprocessor 11.

With the logic-device ownership bitmap 16 of FIG. 4, for example, the logic devices under the ownership of the microprocessor 11 are those with the logic device numbers of "0", "1", "3", and "5".

The logic-device temporary ownership bitmap 17 stores therein information indicating whether the microprocessor 11 temporarily has an ownership with respect to an arbitrary logic device LDEV. This bitmap has entries of all of the logic devices LDEV belonging to the storage device 4, and for every logic device number, is managed to turn on a bit indicating whether or not the logic devices are each temporarily under the ownership of the microprocessor 11. The logic devices being each temporarily under the ownership of the microprocessor 11 include not only those formally under the ownership of the microprocessor 11 but also those during a process of ownership transfer. In this embodiment, a bit of "1" is so set as to be turned on for the logic device(s) LDEV temporarily under the ownership of the microprocessor 11, and a bit of "0" is so set as to be turned on for the logic device(s) LDEV not temporarily under the ownership of the microprocessor 11.

With the logic-device temporary ownership bitmap 17 of FIG. 4, for example, the logic devices temporarily under the ownership of the microprocessor 11 are those with the logic device numbers of "0", "1", "3", "4", and "5". Especially with the logic device with the logic device number "4", a bit is "0" on the logic-device ownership bitmap 16, and a bit is "1" on the logic-device temporary ownership bitmap 17. This thus indicates that the logic device with the logic device number "4" is currently in a process of ownership transfer to the microprocessor 11.

The physical-device-group ownership bitmap 18 stores therein information indicating whether the microprocessor 11 has an ownership with respect to an arbitrary physical device group PDEV-G. This bitmap has entries of all of the physical device groups PDEV-G belonging to the storage device 4, and for every physical device group number, is managed to turn on a bit indicating whether or not the physical device groups are each under the ownership of the microprocessor 11. In this embodiment, a bit of "1" is so set as to be turned on for the physical device group(s) PDEV-G under the ownership of the microprocessor 11, and a bit of "0" is so set as to be turned on for the physical device group(s) PDEV-G not under the ownership of the microprocessor 11.

With the physical-device-group ownership bitmap 18 of FIG. 4, for example, the physical device group under the ownership of the microprocessor 11 is the one with the physical device group number of "0".

The physical-device-group temporary ownership bitmap 19 stores therein information indicating whether or not the microprocessor 11 temporarily has an ownership with respect to an arbitrary physical device group PDEV-G. This bitmap has entries of all of the physical device groups PDEV-G belonging to the storage device 4, and for every physical device group number, is managed to turn on a bit indicating whether the physical device groups are each temporarily under the ownership of the microprocessor 11. The physical device groups PDEV-G being each temporarily under the ownership of the microprocessor 11 include not only those formally under the ownership of the microprocessor 11 but also those during a process of ownership transfer. In this embodiment, a bit of "1" is so set as to be turned on for the physical device group(s) PDEV-G temporarily under the ownership of the microprocessor 11, and a bit of "0" is so set as to be turned on for the physical device group(s) PDEV-G not temporarily under the ownership of the microprocessor 11.

With the physical-device-group temporary ownership bitmap 19 of FIG. 4, for example, the physical device groups PDEV-G temporarily under the ownership of the microprocessor 11 are those with the physical device group numbers of "0" and "4". Especially with the physical device group with the physical device group number "4", a bit is "0" on the physical-device-group ownership bitmap 18, and a bit is "1" on the physical-device-group temporary ownership bitmap 19. This thus indicates that the physical device group with the physical device group number "4" is currently in the process of ownership transfer to the microprocessor 11.

Figure 5:
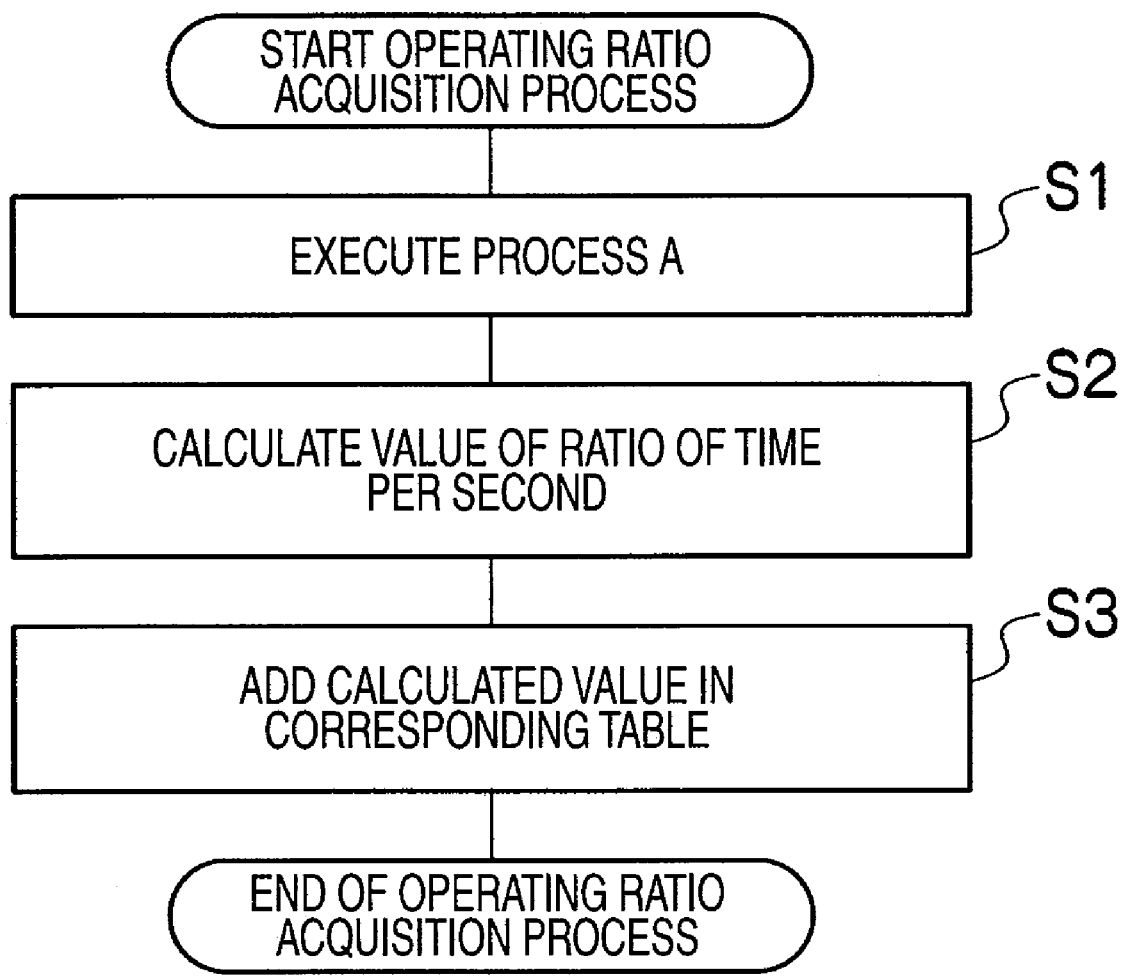
FIG. 5 is a flowchart of an operating ratio acquisition process in the embodiment.

FIG. 5 shows the flowchart of an operating ratio acquisition process for calculating operating ratios in the tables, i.e., the logic-device operating ratio table 12, the physical-device-group operating ratio table 13, and the logic-device-group operating ratio table 14. The operating ratio acquisition process is executed by the CPU 110 of each of the microprocessors 11 based on an operating ratio acquisition program (not shown).

First of all, the CPU 110 of the microprocessor 11 starts the operating ratio acquisition process on a second basis. Thereafter, the CPU 110 of the microprocessor 11 executes a process A in accordance with a request asking for the process A (S1), and then calculates a value of a ratio of time taken for the process A per second (S2). The CPU 110 of the microprocessor 11 then adds the calculated value in the "operating ratio" field of the corresponding table as an operating ratio with respect to the process A (S3). This is the end of the operating ratio acquisition process. Note here that, in this embodiment, the process A is for a data input/output request, a staging request, a destaging request, or a copy request.

The storage device 4 of this embodiment sets the operating ratio tables 12 to 14 into the local memory. The storage device 4 classifies the storage areas in the drive group D into groups according to their storage capacity, and the storage areas classified into groups according to their storage capacity as such are each put under the ownership of the microprocessors 11.

3-3. Storage Contents of Shared Memory

Figure 6:
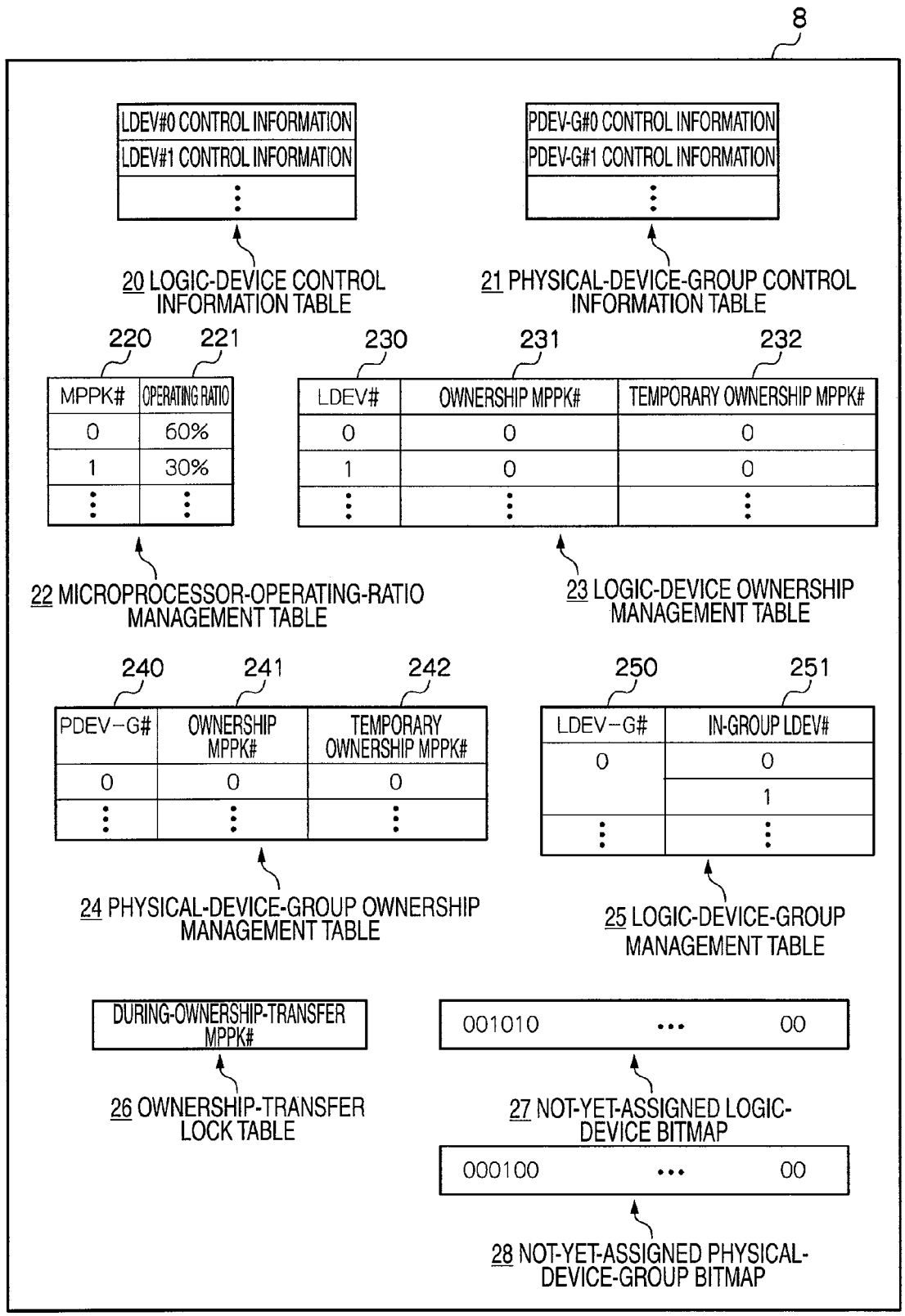
FIG. 6 is an illustration of the storage details of a shared memory in the embodiment.

As shown in FIG. 6, the shared memory 8 stores therein management information and control information of the logic devices LDEV, and management information and control information of the physical devices PDEV. To be specific, the shared memory 8 stores therein a logic-device control information table 20, a physical-device-group control information table 21, a microprocessor-operating-ratio management table 22, a logic-device ownership management table 23, a physical-device-group ownership management table 24, a logic-device-group management table 25, an ownership-transfer lock table 26, a not-yet-assigned logic-device bitmap 27, and a not-yet-assigned physical-device-group bitmap 28.

The logic-device control information table 20 stores therein the control information about each of the logic devices LDEV. The control information includes information needed to control the logic devices LDEV, e.g., addresses on the cache memory 9 carrying therein the data in the logic devices LDEV on a temporary basis. Any of the microprocessors 11 assigned an ownership is allowed to access such control information of the corresponding logic device LDEV.

The physical-device-group control information table 21 stores therein the control information about each of the physical device groups PDEV-G. The control information includes information needed to control the physical device groups PDEV-G, e.g., addresses on the physical drives PDEV actually carrying the data. Any of the microprocessors 11 assigned an ownership is allowed to access such control information of the corresponding physical device group PDEV-G.

The microprocessor-operating-ratio management table 22 stores therein an operating ratio of each of the microprocessors 11. In the table, for keeping the operating ratios the latest, the operating ratios are reset for every second, and the newly-calculated operating ratios are stored. The microprocessor-operating-ratio management table 22 is configured to include an "MPPK#" field 220 indicating microprocessor numbers, and an "operating ratio" field 221 indicating an operating ratio of each of the microprocessors 11.

Figure 7:
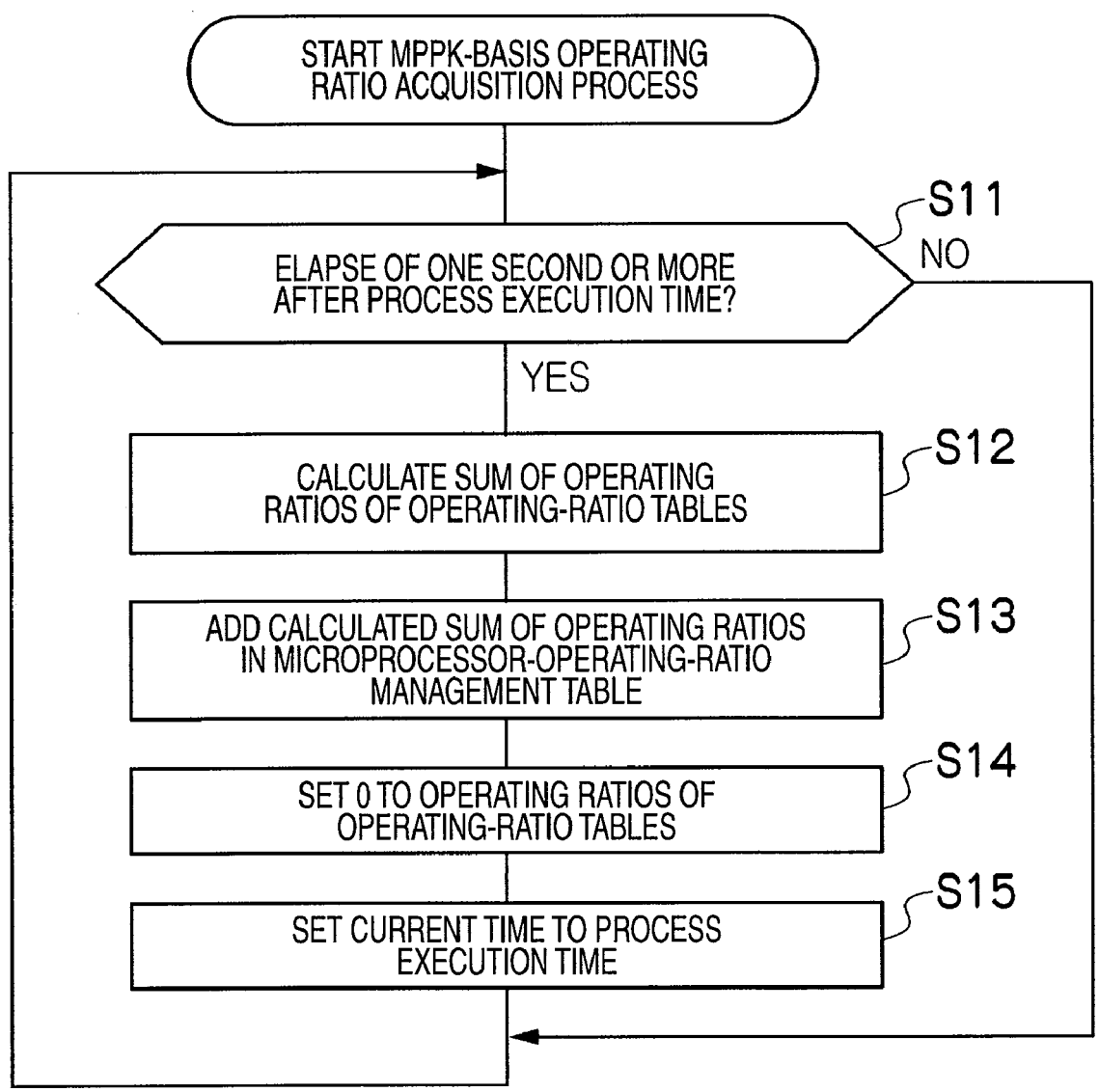
FIG. 7 is a flowchart of the operating ratio acquisition process to be executed on a microprocessor basis in the embodiment.

By referring to the flowchart of FIG. 7, described next is an acquisition process of operating ratios to be stored in the "operating ratio" field 221. The operating ratio acquisition process is executed for each of the microprocessors 11 by the CPU 110 thereof based on the operating ratio acquisition program (not shown).

First of all, the CPU 110 of the microprocessor 11 determines whether the elapse of time after the process execution time is one second or longer (S11). When the elapse of time is one second or longer (S11: YES), the total sum is calculated for the operating ratios found in the operating ratio tables 12 and 14 on the local memory 111 (S12).

With FIG. 4 example, in the logic-device operating ratio table 12, the operating ratios of the logic devices LDEV are 15% and 20%, and thus the sum of the operating ratios in the logic-device operating ratio table 12 is 35%. Similarly, in the operating ratio table 13, the sum of the operating ratios of the physical device groups PDEV-G is 22%, and in the operating ratio table 14, the sum of the operating ratios of the logic device groups is 5%. Accordingly, the total operating ratio of the microprocessor 11 of FIG. 4 is the sum of 35%, 22%, and 5%, i.e., 62%.

The CPU 110 of the microprocessor 11 adds the total operating ratio calculated as such into the microprocessor-operating-ratio management table 22 (S13), and then sets 0 to the operating ratios in the operating ratio tables 12 to 14 (S14). Thereafter, the CPU 110 of the microprocessor 11 sets the current time as the process execution time (S15), and then goes through the process of S11 again. Note here that when the elapse of time is not yet one second or longer in step S11 (S11: NO), the CPU 110 of the microprocessor 11 will not go through the process of step S12 until the elapse of time of one second or longer.

In this embodiment, the CPUs 110 of the microprocessors 11 are each so set as to execute the operating ratio acquisition process on a second basis. Alternatively, any time interval will do as long as it is good for acquisition of the latest operating ratio information.

The logic-device ownership management table 23 is provided for managing any of the microprocessors 11 assigned an ownership with respect to an arbitrary logic device LDEV. The logic-device ownership management table 23 is configured to include an "LDEV#" field 230, an "ownership MPPK#" field 231, and a "temporary ownership MPPK#" field 232. The "LDEV#" field 230 indicates the number of the logic device. The "ownership MPPK#" field 231 indicates a number of the microprocessor assigned an ownership with respect to the logic device, and the "temporary ownership MPPK#" field 232 indicates a number of the microprocessor temporarily assigned an ownership with respect to the logic device.

In the logic-device ownership management table 23 in FIG. 6, for example, the logic device "1" is currently under the ownership of the microprocessor 11"0". For transferring the ownership to the microprocessor 11 "1", in the "temporary ownership MPPK#" field 232, "0" is changed to "1". After the completion of such ownership transfer, in the "ownership MPPK#" field 231, "0" is changed to "1".

The physical-device-group ownership management table 24 is provided for managing any of the microprocessors 11 assigned an ownership with respect to an arbitrary physical device group PDEV-G. The physical-device-group ownership management table 24 is configured to include a "PDEV-G#" field 240, an "ownership MPPK#" field 241, and a "temporary ownership MPPK#" field 242. The "PDEV#" field 240 indicates the number of the physical device group. The "ownership MPPK#" field 241 indicates a number of the microprocessor assigned an ownership with respect to the physical device group PDEV-G, and the "temporary ownership MPPK#" field 242 indicates a number of the microprocessor temporarily assigned an ownership with respect to the physical device group PDEV-G.

Similarly to the logic-device ownership management table 23, in the physical-device-group ownership management table 24 in FIG. 6, for example, for transferring the ownership of the physical device group "0" to the microprocessor 11"1", in the "temporary ownership MPPK#" field 242, "0" is changed to "1". With the completion of such ownership transfer, in the "ownership MPPK#" field 241, "0" is changed to "1".

The logic-device-group management table 25 is provided for managing the logic device(s) LDEV in each of the logic device groups LDEV-G. The logic-device-group management table 25 is configured to include an "LDEV-G#" field 250, and an "in-group LDEV#" field 251. The "LDEV-G#" field 250 indicates numbers of the logic device groups, and the "in-group LDEV#" field 251 indicates a number(s) of the logic device(s) in the logic device group. The "in-group LDEV#" field 251 stores therein the number(s) of the logic device(s) being the source of copying and the number(s) of the logic device(s) being the destination of copying.

The ownership-transfer lock table 26 includes entries of numbers of the microprocessors currently in the process of ownership transfer. Once any predetermined microprocessor 11 is added into this table, the remaining microprocessors 11 are not allowed for ownership transfer.

The not-yet-assigned logic-device bitmap 27 stores therein information indicating whether any of the microprocessors 11 is assigned an ownership with respect to an arbitrary logic device LDEV. When none of the microprocessors 11 is assigned an ownership, it means that the storage device 4 is formed therein with a logic device(s) LDEV but none of the microprocessors 11 is assigned an ownership thereof. The bitmap includes entries of all of the logic devices LDEV belonging to the storage device 4, and for every logic device number, is so managed as to turn on a bit indicating whether or not the logic devices are each under the ownership of any of the microprocessors. In this embodiment, when the logic device LDEV is not under the ownership of any of the microprocessors 11, a bit of "1" is turned on, and when the logic device LDEV is under the ownership thereof, a bit of "0" is turned on.

The not-yet-assigned logic-device bitmap 27 of FIG. 6 shows, for example, that the logic devices "2" and "4" are those not yet under the ownership.

The not-yet-assigned-physical-device bitmap 28 stores therein information indicating whether any of the microprocessors 11 is assigned an ownership with respect to an arbitrary physical device group PDEV-G. When none of the microprocessors 11 is assigned an ownership, it means that the storage device 4 is formed therein with a physical device group(s) PDEV-G but none of the microprocessors 11 is assigned an ownership thereof. The bitmap includes entries of all of the physical device groups PDEV-G belonging to the storage device 4, and for every physical device group number, is so managed as to turn on a bit indicating whether or not the physical device groups are each under the ownership of any of the microprocessors. In this embodiment, when the physical device group PDEV-G is not under the ownership of any of the microprocessors 11, a bit of "1" is turned on, and when the physical group device PDEV-G is under the ownership thereof, a bit of "0" is turned on.

The not-yet-assigned physical-device-group bitmap 28 of FIG. 6 shows, for example, that the physical device group "3" is the one not yet under the ownership.

4. Ownership Transfer Process

In the embodiment, considering the correlation between devices and device groups under the ownership of any one microprocessor 11, the microprocessor 11 executes an ownership transfer process for load distribution of its own. The ownership transfer process is executed in two manners; one is mainly by the microprocessor 11, and the other is by the microprocessor 11 not mainly but based on a user designation.

4A. Ownership Transfer Process by Microprocessor

Figure 8:
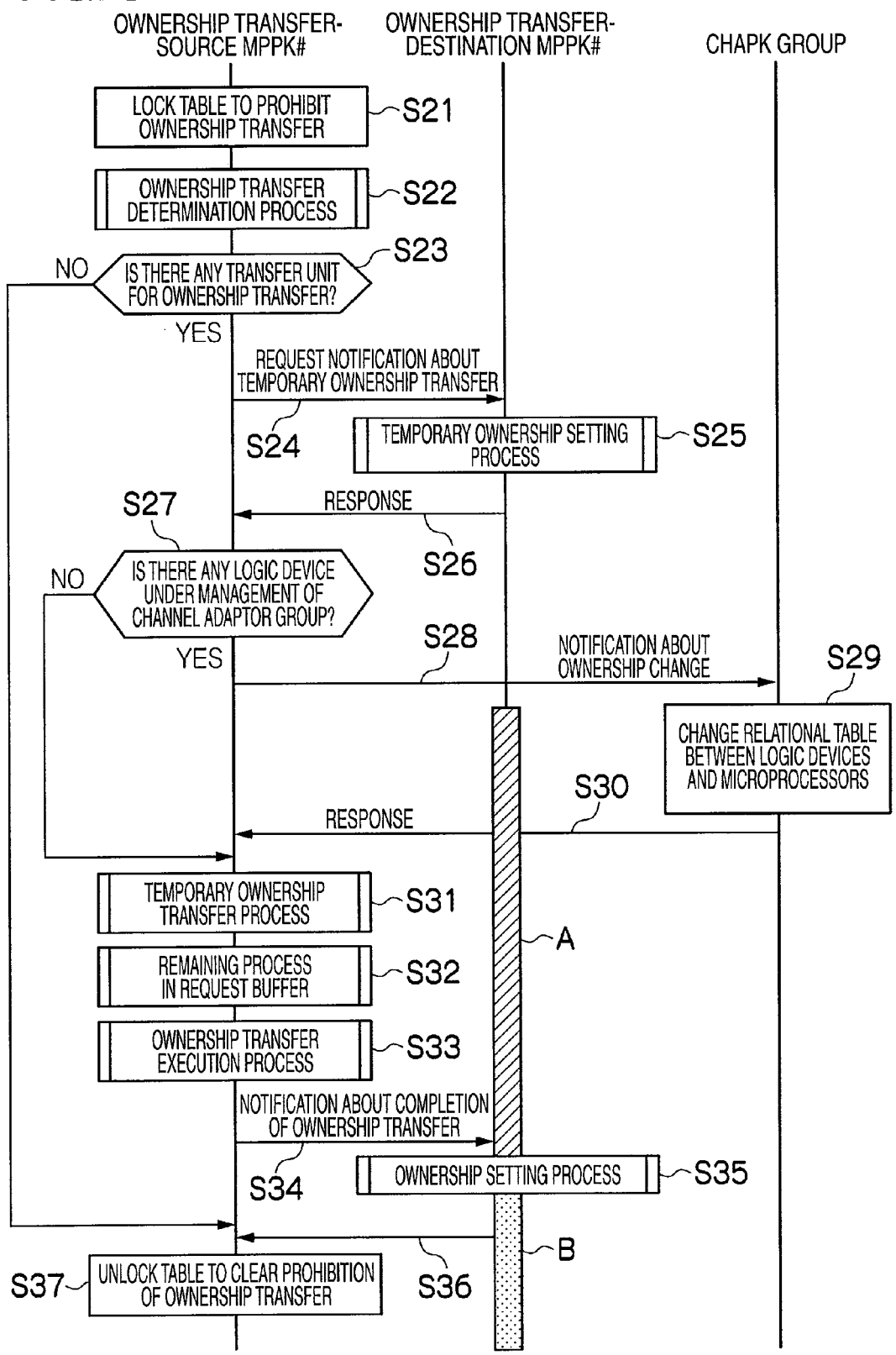
FIG. 8 is a flowchart of an ownership transfer process to be executed by the microprocessors in the embodiment.

By referring to the flowchart of FIG. 8, described first is the ownership transfer process mainly executed by the microprocessor 11. The process of ownership transfer is executed by the microprocessor 11 on a regular basis based on an ownership transfer program (not shown).

To be specific, the CPU 110 of the microprocessor 11 being the destination of ownership transfer (hereinafter, simply referred to as "transfer-destination CPU") adds the number of its own microprocessor in the ownership-transfer lock table 26, and locks the table 26 to prohibit ownership transfer (S21). That is, the remaining microprocessors 11 are prohibited from ownership transfer.

Next, the transfer-source CPU 110 executes an ownership transfer determination process, and determines the type of a transfer unit for ownership transfer, and which of the microprocessors 11 is to be the destination for the ownership transfer (S22). The specific processing procedure of the ownership transfer determination process will be described later.

Figure 9:
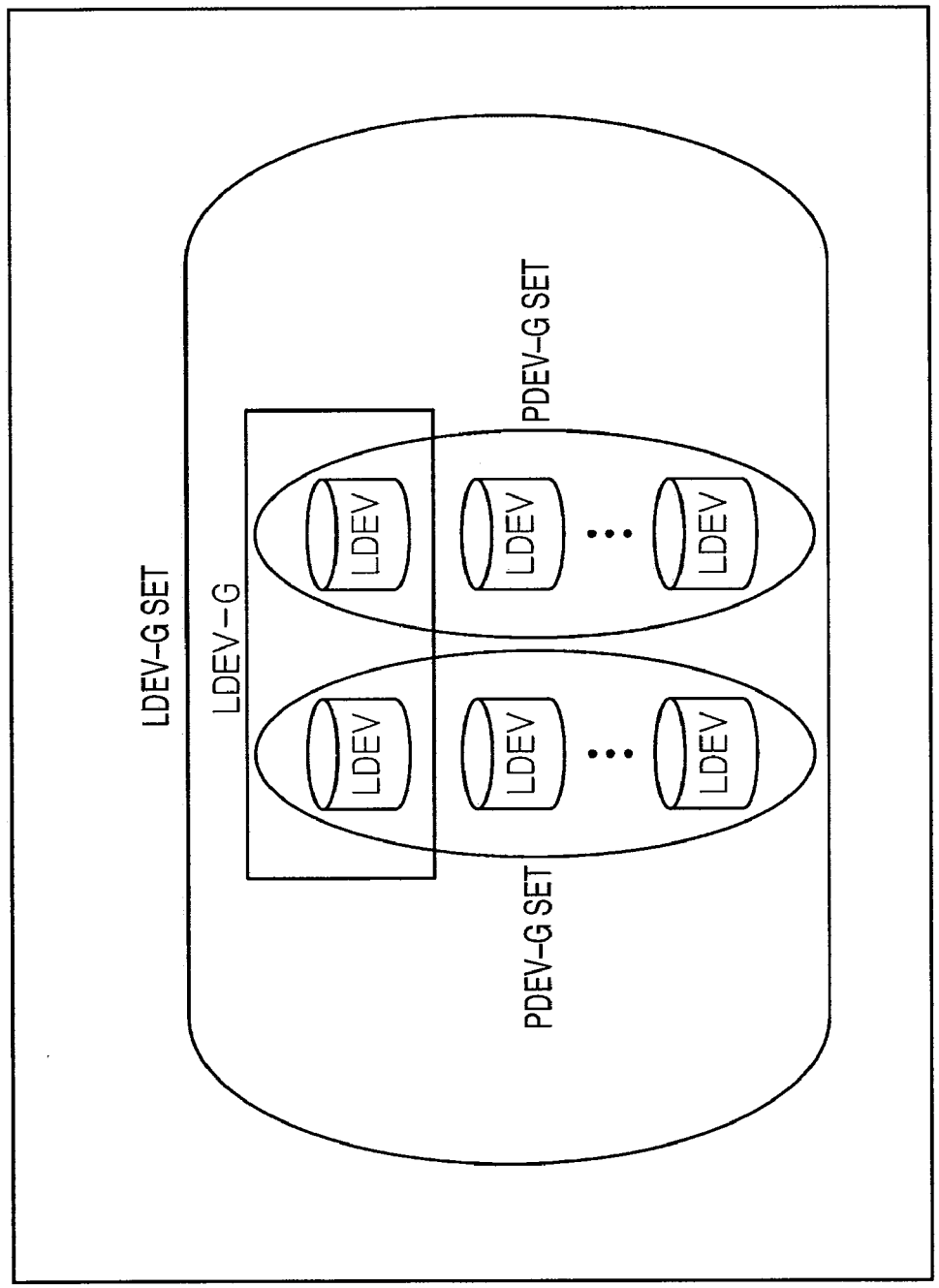
FIG. 9 is a conceptual diagram of a transfer unit in the embodiment.

The transfer unit here is a unit of storage areas for ownership transfer from the transfer-source microprocessor 11 to the transfer-destination microprocessor 11, and is used for load distribution of the transfer-source microprocessor 11. As shown in FIG. 9, in this embodiment, the types of transfer unit allowed for the storage device 4 to determine include a logic device (denoted as LDEV in the drawing) unit, a physical device group set (denoted as PDEV-G set in the drawing; hereinafter simply referred to as physical set) unit, and a logic device group set (denoted as LDEV-G set in the drawing, hereinafter, simply referred to as logic set) unit.

The logic device unit is a unit for transferring the ownership currently assigned to any of the logic devices LDEV.

The physical set unit is a unit for transferring the ownership currently assigned to any of the physical device groups PDEV-G, and the ownership currently assigned to any of the logic devices belonging to any of the physical device groups PDEV-G.

The logic set unit denotes a logic device unit, a physical set unit including any of the logic devices LDEV being the copy source of any of the logic device groups LDEV-G, and a physical set unit including any of the logic devices LDEV being the copy source of any of the logic device groups LDEV-G.

By referring back to FIG. 8, the transfer-source CPU 110 determines whether there is a transfer unit for ownership transfer based on the result in step S22 (S23), and when there is no such transfer unit (S23: NO), the process of step S37 is executed (will be described later).

On the other hand, when determining that there is such a transfer unit for ownership transfer (S23: YES), the transfer-source CPU 110 issues a temporary ownership transfer request to the microprocessor 11 determined as the transfer destination in step S22, and then notifies the number of a transfer target in the transfer unit (S24). In this embodiment, the number of the transfer target to be transferred by the storage device 4 is exemplified by a logic device number, a logic device group number, and a physical device group number, but these are not surely restrictive, and any number will do as long as it is the unit number of the storage areas under the management of any one of the microprocessors 11, e.g., physical device number.

Upon reception of the temporary ownership transfer request, the CPU 110 of the transfer-destination micropro- cessor 11 (hereinafter, simply referred to as transfer-destination CPU) executes a temporary ownership setting process, and turns on a bit in the logic-device temporary ownership bitmap 17, and/or a bit in the physical-device-group temporary ownership bitmap 19 (S25). The bits are those corresponding to the notified logic device number or others. The temporary ownership setting process will be described later. Thereafter, the transfer-destination CPU notifies the transfer-destination microprocessor 11 that the temporary ownership setting process is completed (S26).

By referring to the result in step S22 and the logic-device operating ratio table 12, the transfer-source CPU 110 determines whether there is a target for ownership transfer, i.e., any logic device under the management of the channel adaptor group (S27). When determining that there is no such logic device under the management of the channel adaptor group (S27: NO), the transfer-source CPU 11 executes the process of step S31 that will be described later. In this embodiment, the channel adaptor group manages the logic devices to which an input/output request is issued by the host device 2.

On the other hand, when determining that there is such a logic device being a target of the input/output request (S27: YES), the transfer-source CPU 110 notifies the channel adaptor group to change the ownership of the logic device (S28).

The CPU 60 of the channel adaptor group receives the number of the logic device being a target for ownership change, and the number of the microprocessor being the transfer destination, thereby changing the contents in the relational table 610. To be specific, the CPU 60 of the channel adaptor group changes the number of the microprocessor correlated to the number of the logic device being the change target to the number of the transfer-destination microprocessor (S29). As such, the CPU 60 of the channel adaptor group notifies the transfer-source microprocessor 11 of the change as such (S30).

Thereafter, the transfer-source CPU 110 executes a temporary ownership transfer process, and adds the number of the transfer target determined in step S22 in the tables (S31), i.e., in the "temporary ownership MPPK#" field 232 of the logic-device ownership management table 23, and the "temporary ownership MPPK#" field 242 of the physical-device-group ownership management table 24. The temporary ownership transfer process will be described later.

The transfer-source CPU 110 executes the remaining process, i.e., process various requests left in the request buffer 15 (S32). The remaining process will be described later. After the completion of the remaining process, the transfer-source CPU 110 executes an ownership transfer execution process (S33). That is, the transfer-source CPU 110 changes the bit, i.e., changes from "1" to "0" the corresponding bit in the logic-device ownership bitmap 16 and/or in the physical-device-group ownership bitmap 18, and also changes from "1" to "0" the corresponding bit in the logic-device temporary ownership bitmap 17 and/or in the physical-device-group temporary ownership bitmap 19. The transfer-destination CPU 110 also adds the number of the transfer-destination microprocessor 11 in the "ownership MPPK#" field 231 of the logic-device ownership management table 23, and/or in the "ownership MPPK#" field 241 of the physical-device-group ownership management table 24. After completion of ownership transfer to the transfer-destination microprocessor 11 as such, the transfer-source CPU 110 notifies the completion of the ownership transfer to the transfer-destination microprocessor 11 (S34).

The transfer-destination CPU 110 executes an ownership setting process, and changes from "1" to "1" the corresponding bit in the logic-device ownership bitmap 16 and that in the physical-device-group ownership bitmap 18 (S35). The ownership setting process will be described later. As such, the transfer-destination CPU 110 forwards an ownership setting notification to the transfer-source CPU 110 (S36).

Upon reception of the ownership setting notification from the transfer-destination CPU 110, the transfer-source CPU 110 deletes the number of its own microprocessor added in the ownership-transfer lock table 26, and then unlocks the table to clear the prohibition of ownership transfer (S37). This is the end of the transfer process.

In a period after the transfer-source CPU 110 notifies the channel adaptor group that the ownership of the logic device is changed but until the completion notification of the ownership transfer to the transfer-destination CPU 110 (denoted by A in the drawing), the transfer-destination microprocessor 11 temporarily has the ownership. Therefore, the request issued to the transfer-destination microprocessor 11 is continuously accumulated in the request buffer 15. The transfer-destination CPU 110 then starts executing the ownership setting process, and when the transfer-destination microprocessor 11 is formally assigned the ownership (denoted by B in the drawing), the transfer-destination CPU 110 starts executing various requests accumulated in the request buffer 15. The specific procedure for the transfer-destination microprocessor 11 to execute the process of the request buffer 15 will be described later.

4A-1. Ownership Transfer Determination Process

Figure 10:
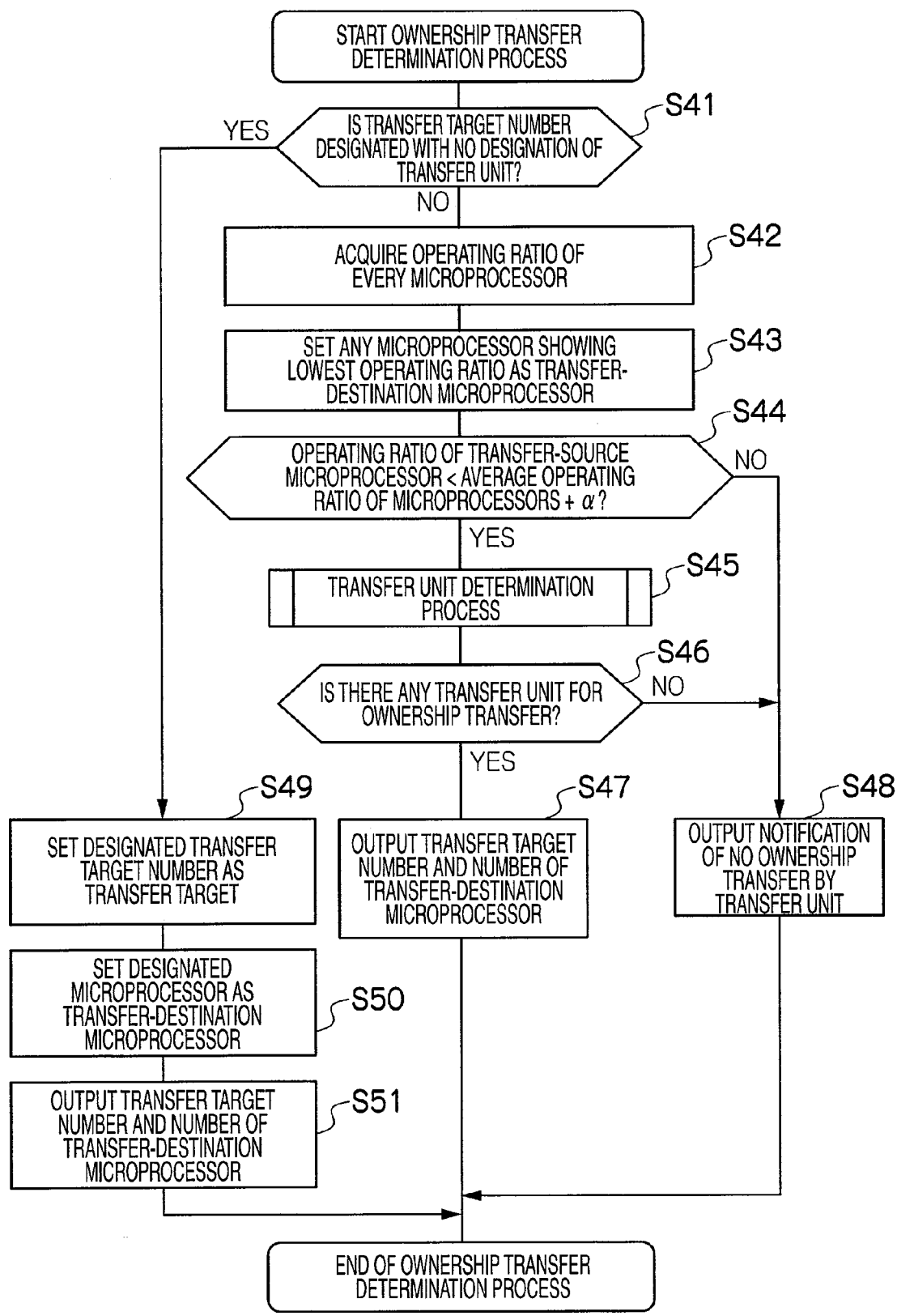
FIG. 10 is a flowchart of an ownership transfer determination process in the embodiment.

The various processes to be executed during the ownership transfer process are described in detail. First of all, by referring to the flowchart of FIG. 10, the ownership transfer determination process of step S22 is described. The ownership transfer determination process is executed by the transfer-source microprocessor 11 based on the ownership transfer program (not shown).

When the transfer-source CPU 110 locks the table to prevent ownership transfer by the remaining microprocessors 11, the ownership transfer determination process is started. Thereafter, the transfer-source CPU 110 determines whether a transfer target number is designated with no designation of a transfer unit (S41). When the ownership transfer is designated by a transfer unit (S41: NO), the microprocessor-operating-ratio management table 22 is referred to for acquiring the operating ratio of every microprocessor 11 (S42). The transfer-source CPU 110 determines, as the transfer-destination microprocessor 11, any of the microprocessors 11 showing the lowest operating ratio (S43). The transfer-source CPU 110 then determines whether the operating ratio of the transfer-source microprocessor 11 is exceeding the operating ratio, which is the result of adding a predetermined value α to the average operating ratio of the microprocessors 11 (S44). Herein, the average operating ratio of the microprocessors 11 denotes the average value of the operating ratios of all of the microprocessors 11 found in the microprocessor-operating-ratio management table 22.

When the operating ratio of the transfer-source microprocessor 11 exceeds the operating ratio being a result of adding an arbitrary value to the average operating ratio of the microprocessors 11 (S44: YES), the transfer-source CPU 110 executes the transfer unit determination process to determine which transfer unit is to be used as a transfer target (S45). That is, the transfer-source CPU 110 determines the transfer unit, i.e., any or none of the logic device unit, the physical set unit, and the logic set unit.

The transfer-source CPU 110 determines whether there is a transfer unit being the transfer target (S46), and for performing ownership transfer by the transfer unit (S46: YES), outputs the number of the transfer target found in the transfer unit and the number of the microprocessor being the transfer destination (S47). This is the end of the ownership transfer determination process.

On the other hand, when the operating ratio of the transfer-source microprocessor 11 is lower than the operating ratio being a result of adding an arbitrary value to the average operating ratio of the microprocessors 11 (S44: NO), or when there is no transfer unit for ownership transfer (S46: NO), the transfer-source CPU 110 outputs a notification of no ownership transfer by a transfer unit (S48), and this is the end of the ownership transfer determination process.

In step S41, when the number of a transfer target is designated by user designation with no designation of a transfer unit (S41: YES), the transfer-source CPU 110 sets thus designated transfer target number as the target for ownership transfer (S49). For example, as the transfer target number, a logic device number or a physical device group number is designated by a user. The transfer-source CPU 110 sets the user-designated microprocessor 11 as the transfer-destination microprocessor 11 (S50). The transfer-source CPU 110 then outputs the setting results, i.e., the transfer target number and the transfer-destination microprocessor number (S51). This is the end of the ownership transfer determination process.

4A-2. Transfer Unit Determination Process

Figure 11:
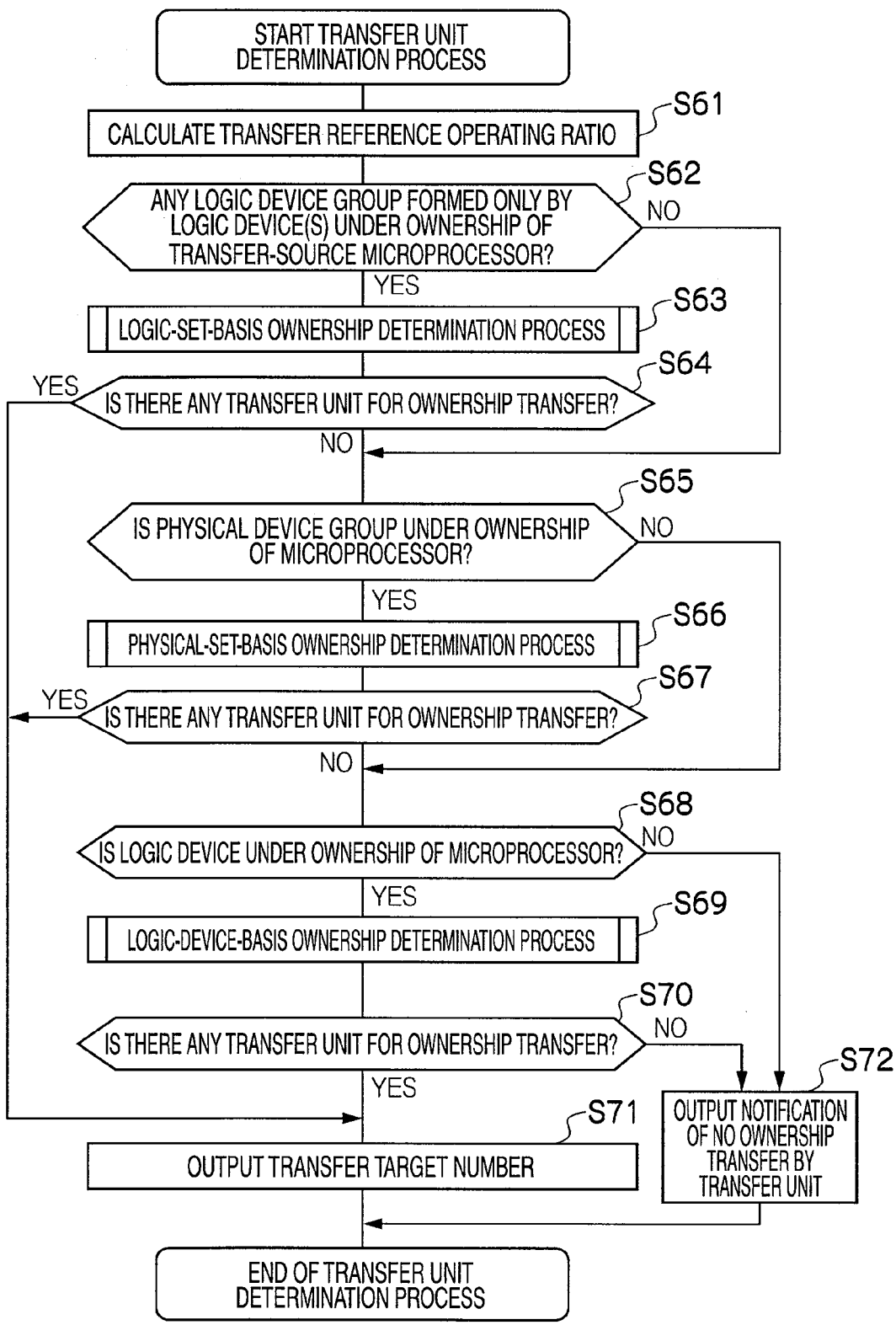
FIG. 11 is a flowchart of a transfer unit determination process in the embodiment.

Described next is the transfer unit determination process of step S45. The transfer unit determination process is described by referring to the flowchart of FIG. 11.

Figure 12:
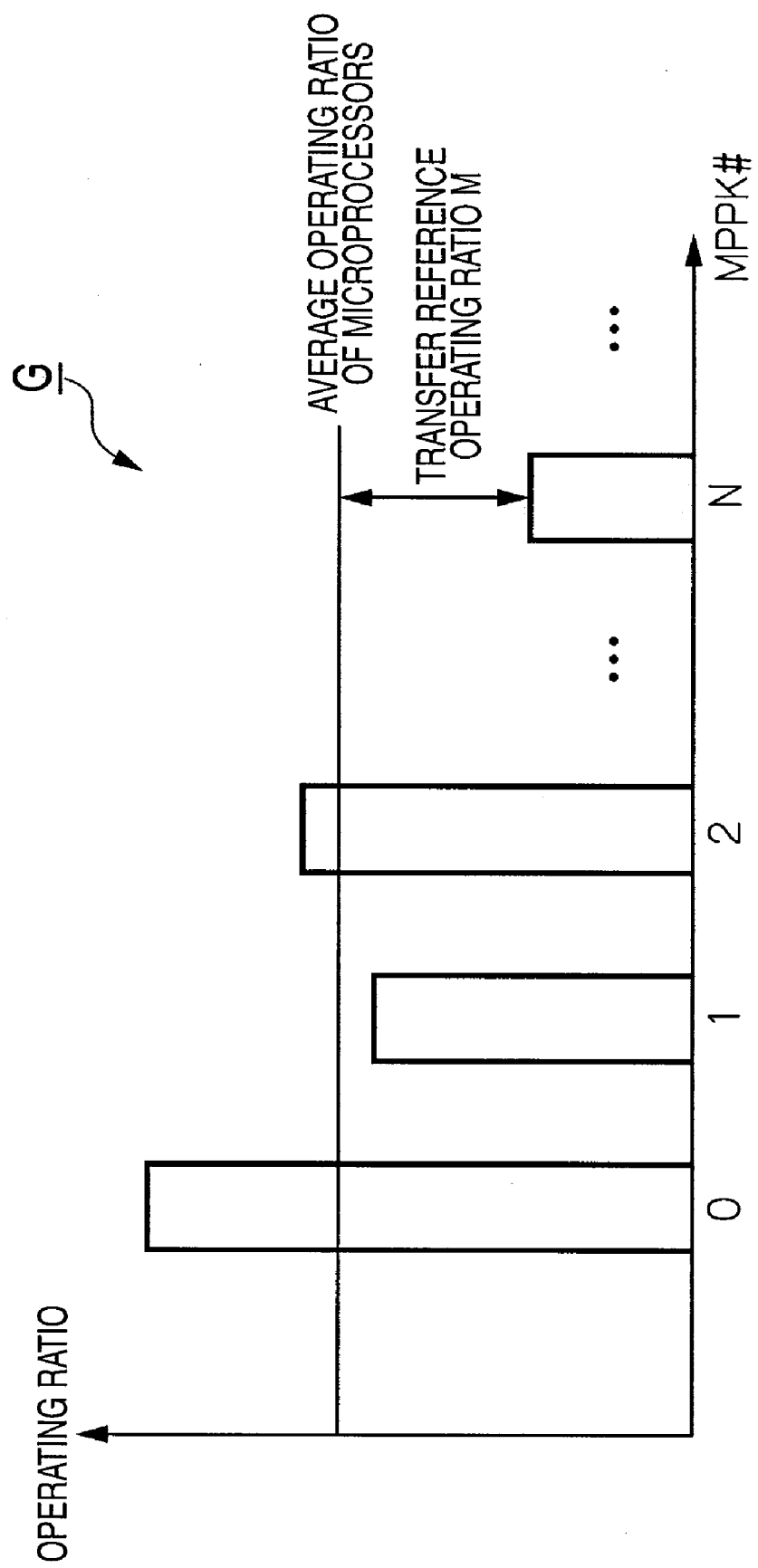
FIG. 12 is a graph for illustrating a transfer reference operating ratio in the embodiment.

Because the transfer-destination microprocessor 11 has been determined in step S43, the transfer-source CPU 110 calculates a transfer reference operating ratio from the operating ratio of the transfer-destination microprocessor 11 and the average operating ratio of the microprocessors 11 (S61). The transfer reference operating ratio is a value serving as a reference for transfer of the operating ratio from the transfer-source microprocessor 11 to the transfer-destination microprocessor 11. Using the graph G of FIG. 12, a specific description will be given. This bar graph G indicates the operating ratio of each of the microprocessors 11, i.e., the vertical axis indicates the operating ratios, and the lateral axis indicates the microprocessor numbers. When the transfer-source CPU 110 selects the microprocessor 11"N" as the transfer-destination microprocessor 11, the transfer reference operating ratio M will be a value as a result of subtracting the operating ratio of the transfer-destination microprocessor 11"N" from the average operating ratio of the microprocessors 11. The transfer-source CPU 110 then determines whether there is a logic device group formed only by the logic device(s) under the ownership of the transfer-source microprocessor 11 (S62). From the logic-device-group operating ratio table 14, the transfer-source CPU 110 acquires the number(s) of the logic device(s) forming each of the logic device groups LDEV-G. The transfer-source CPU 110 then refers to the logic-device ownership bitmap 16 to check whether a bit "1" is turned on in every corresponding portion of the acquired logic device number(s).

When the transfer-source microprocessor 11 determines that there is a logic device group LDEV-G formed only by the logic device(s) under the ownership of the transfer-source microprocessor 11 (S62: YES), there may be a possibility that the ownership transfer can be performed on a logic set basis so that the transfer-source CPU 110 executes the ownership determination process on a logic set basis (S63). The ownership determination process on a logic set basis is described later.

Thereafter, when the ownership transfer can be performed on a logic set basis (S64: YES), the transfer-source CPU 110 outputs the number of a transfer target in thus determined logic set unit (S71). This is the end of the transfer unit determination process.

On the other hand, when the ownership transfer cannot be performed on a logic set basis (S64: NO), the transfer-source CPU 110 determines whether any of the physical device groups PDEV-G is under the ownership of the transfer-source microprocessor 11 (S65). The transfer-source CPU 110 acquires the number(s) of the physical device group(s) from the physical-device group operating ratio table 13. The transfer-source CPU 110 then refers to the physical-device-group ownership bitmap 18 to see whether a bit "1" is turned on in every position corresponding to thus acquired physical device number(s). When any of the physical groups is under the ownership of the transfer-source microprocessor 11 (S65; YES), there may be a possibility that the ownership transfer can be performed on a physical set basis so that the transfer-source CPU 110 executes the ownership determination process on a physical set basis (S66). The ownership determination process on a physical set basis will be described later.

Thereafter, when the ownership transfer can be performed on a physical set basis (S67: YES), the transfer-source CPU 110 outputs the number of a transfer target in thus determined physical set unit (S71). This is the end of the transfer unit determination process.

On the other hand, in step S65, when none of the physical device groups PDEV-G is under the ownership of the transfer-source microprocessor 11 (S65: NO), or when the ownership transfer cannot be performed on a physical set unit (S67: NO), the transfer-source CPU 110 determines whether any of the logic devices is under the ownership of the transfer-source microprocessor 11 (S68). The transfer-source CPU 110 acquires the logic device number(s) from the logic-device operating ratio table 13. The transfer-source CPU 110 then refers to the logic-device ownership bitmap 16 to see whether or not a bit "1" is turned on in every position corresponding to thus acquired logic device number(s).

When any of the logic devices is under the ownership of the transfer-source microprocessor 11 (S68; YES), there may be a possibility that the ownership transfer can be performed on a logic device basis so that the transfer-source CPU 110 executes the ownership determination process on a logic device basis (S69). The ownership determination process on a logic device basis is described later.

Thereafter, when the ownership transfer can be performed on a logic device basis (S70: YES), the transfer-source CPU 110 outputs the number of a transfer target in thus determined logic set unit (S71). This is the end of the transfer unit determination process.

Note here that when none of the logic devices is under the ownership of the transfer-source microprocessor 11 (S68: NO), or when the ownership transfer cannot be performed on a logic device basis (S70: NO), the transfer-source CPU 110 outputs a notification of no ownership transfer by a transfer unit (S72). This is the end of the transfer unit determination process.

4A-2-1. Logic-Set-Basis Ownership Determination Process

Figure 13:
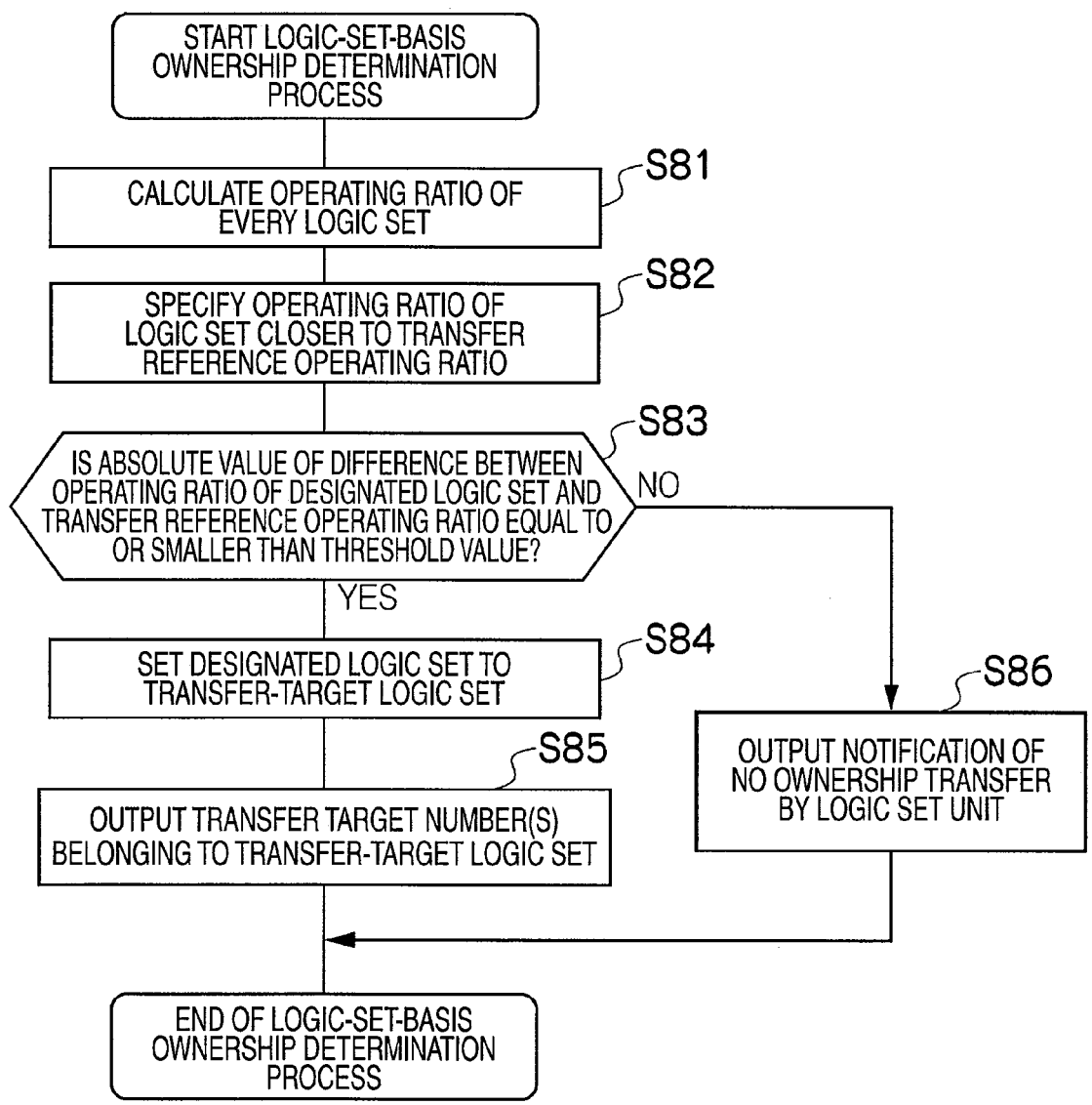
FIG. 13 is a flowchart of an ownership determination process on a logic set basis in the embodiment.

By referring to the flowchart of FIG. 13, described next is the logic-set-basis ownership determination process of step S63.

When determining that there is a possibility for ownership transfer on a logic set basis, the transfer-source CPU 110 starts the logic-set-basis ownership determination process.

The transfer-source CPU 110 then calculates the operating ratio of every logic set formed only by a logic device(s) under the ownership of the transfer-source microprocessor 11 (S81).

FIG. 14 shows a method for calculating the operating ratios.

The operating ratio of a logic set is a result of adding the total operating ratio of the physical set(s) in each of the logic device groups LDEV-G to the total operating ratio of the logic device groups LDEV-G.

The total operating ratio of the logic device groups LDEV-G is the sum of all of the operating ratios found in the "operating ratio" field 142 of the logic-device-group operating ratio table 14.

The total operating ratio of the physical set(s) in each of the logic device groups LDEV-G is a result of adding the total operating ratio of the logic device(s) LDEV in each of the physical device groups PDEV-G to the total operating ratio of the physical device groups PDEV-G.

The total operating ratio of the physical device groups PDEV-G is the sum of all of the operating ratios found in the "operating ratio" field 133 of the physical-device-group operating ratio table 13. The operating ratio of the logic device(s) LDEV in each of the physical device groups PDEV-G is the sum of the operating ratios of the logic devices LDEV, i.e., those found in the "operating ratio" field 121 of the logic-device operating ratio table 12, and those in any of the physical device groups PDEV-G.

After calculating the operating ratio of every logic set, from the calculation results, the transfer-source CPU 110 specifies the operating ratio closest to the transfer reference operating ratio calculated in step S61 (S82). When the absolute value of a difference between the specified operating ratio and the transfer reference operating ratio is a threshold value or smaller (S83: YES), the specified logic set is set as a transfer target (S84). The threshold value in step S83 is set to be a value of a level not increasing the difference between the specified operating ratio and the transfer reference operating ratio.

The transfer-source CPU 110 then outputs the number of a transfer target found in the specified logic set (S85). The number of the transfer target here denotes the physical device group number(s) and the logic device number(s) belonging to the specified logic set. As such, the transfer-source CPU 110 ends this process.

Herein, when the absolute value of the difference between the specified operating ratio and the transfer reference operating ratio is a value larger than the threshold value (S83: NO), the transfer-source CPU 110 outputs a notification of no ownership transfer on a logic set basis is output (S86), and this is the end of the process.

As such, in the ownership determination process, the operating ratio closest to the transfer reference operating ratio is specified. Accordingly, the microprocessor 11 showing the high operating ratio can be reduced in load down to about the average operating ratio so that any possible delay of processing time can be favorably avoided. Moreover, because any transfer unit under the ownership of the same microprocessor is determined as a transfer target, another microprocessor 11 newly assigned the ownership is no more required to communicate with the transfer-source microprocessor 11, thereby facilitating the management of the newly-assigned devices and device groups.

4A-2-2. Physical-Set-Basis Ownership Determination Process

Figure 15:
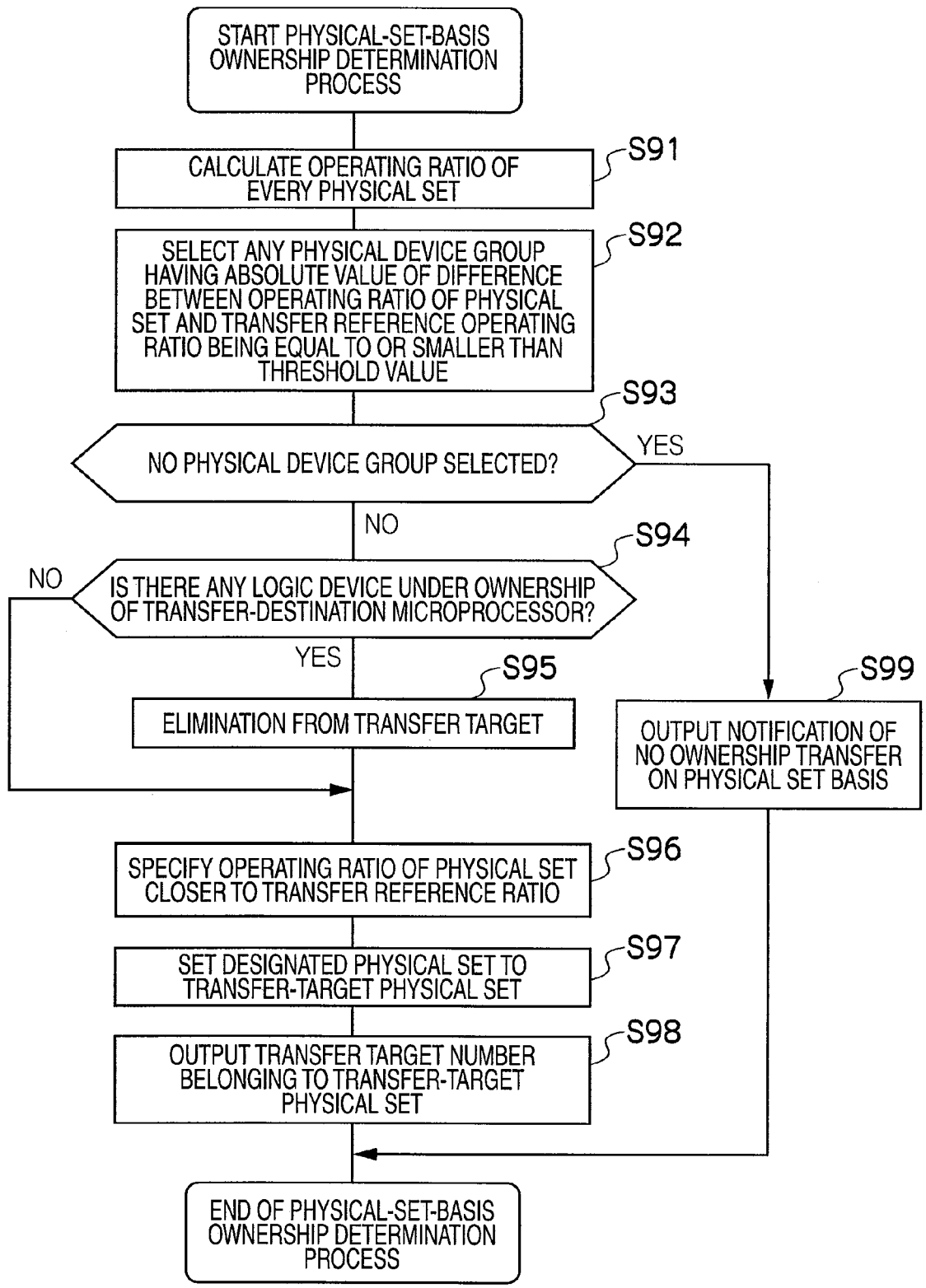
FIG. 15 is a flowchart of an ownership determination process on a physical set basis in the embodiment.

By referring to the flowchart of FIG. 15, described next is the physical-set-basis ownership determination process of step S66.

When determining that there is a possibility for ownership transfer on a physical set basis, the transfer-source CPU 110 starts the physical-set-basis ownership determination process.

The transfer-source CPU 110 then calculates the operating ratio of the physical sets found in all of the physical device groups PDEV-G under the ownership of the transfer-source microprocessor 11 (S91). As shown in FIG. 14, the operating ratio of a physical set is a result of adding the total operating ratio of the logic device(s) LDEV in each of the physical device groups PDEV-G to the total operating ratio of the physical device groups PDEV-G.

From the calculated operating ratios of the physical sets, the transfer-source CPU 110 selects any of the physical device groups PDEV-G showing an absolute value of a difference between the operating ratio of the physical set and the transfer reference operating ratio is a threshold value or smaller (S92).

When one or more physical device groups PDEV-G are selected (S93: NO), the transfer-source CPU 110 determines whether the logic device(s) LDEV in the selected physical device group(s) PDEV-G are under the ownership of the transfer-destination microprocessor 11 (S94). By referring to the logic-device ownership management table, the transfer-source CPU 110 determines whether the logic device(s) are under the ownership of the transfer-destination microprocessor 11. When there is no such logic device being under the ownership of the transfer-destination microprocessor 11 (S94: NO), the transfer-source CPU 110 goes through the process of step S96.

Among the logic devices LDEV belonging to the selected physical device group(s) PDEV-G, when there is any logic device LDEV under the ownership of the transfer-destination microprocessor 11 (S94: YES), the transfer-source CPU 110 eliminates, from the group of transfer target(s), the physical device group PDEV-G including the logic device LDEV (S95).

Among the operating ratios of the selected physical set, the transfer-source CPU 110 specifies the operating ratio closest to the transfer reference operating ratio calculated in step S61 (S96), and sets the designated physical set as a transfer target (S97).

Thereafter, the transfer-source CPU 110 outputs the number of the transfer target belonging to the specified physical set (S98). The number of the transfer target denotes the physical device group(s) and the logic device number(s) in the specified physical set. The transfer-source CPU 110 then ends this process.

Note that, in step S93, when the transfer-source CPU 110 selects none of the physical device groups PDEV-G (S93: NO), the notification of no ownership transfer on a physical set basis is output (S99), and this is the end of the process.

4A-2-3. Logic-Device-Basis Ownership Determination Process

Figure 16:
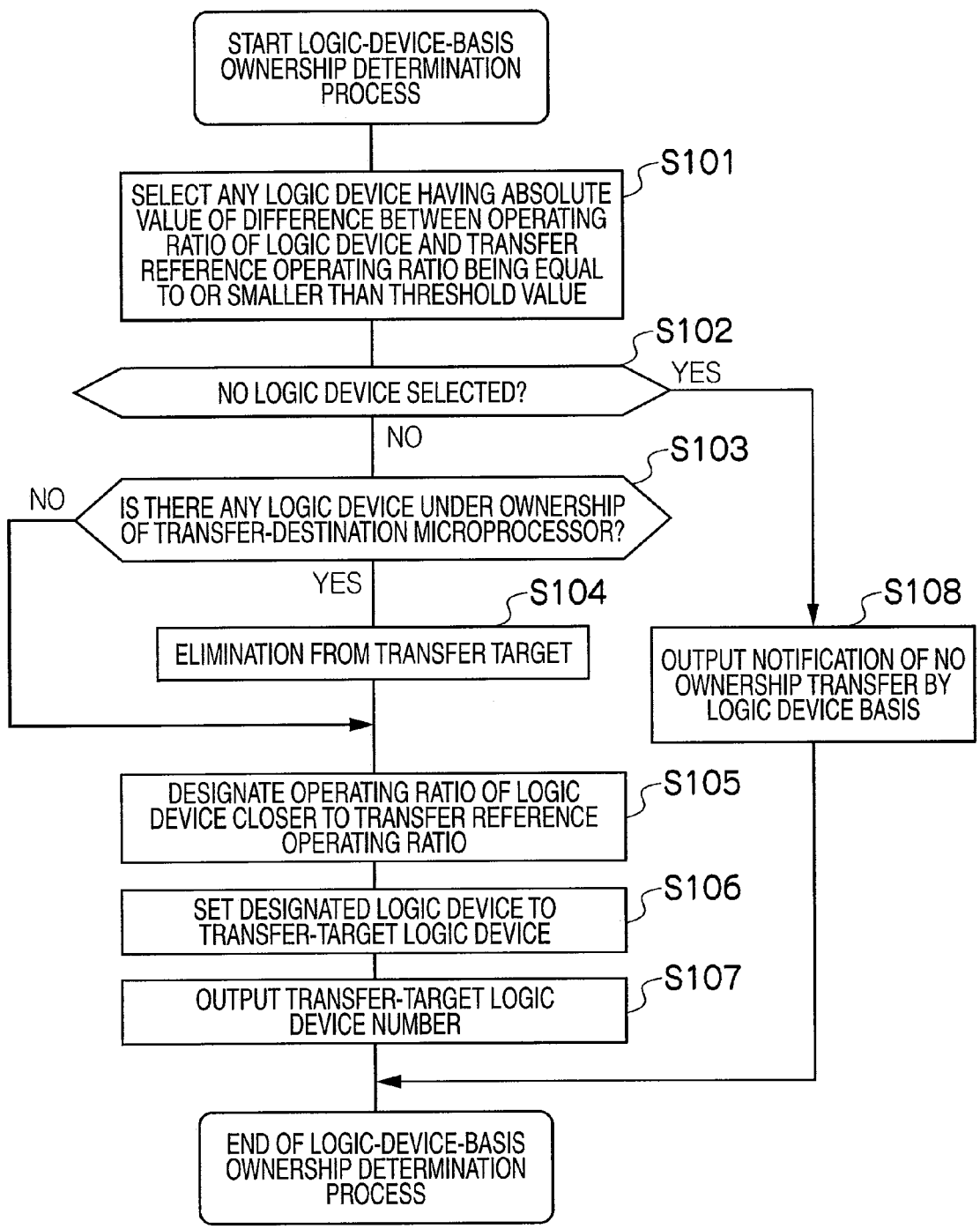
FIG. 16 is a flowchart of an ownership determination process on a logic device basis in the embodiment.

By referring to the flowchart of FIG. 16, described next is the logic-device-basis ownership determination process of step S69.

When determining that there is a possibility for ownership transfer on a logic device basis, the transfer-source CPU 110 starts the logic-device-basis ownership determination process.

Among the operating ratios of the logic devices LDEV, the transfer-source CPU 110 selects any of the logic devices showing an absolute value of a difference between the operating ratio of the logic device and the transfer reference operating ratio is a threshold value or smaller (S101).

The transfer-source CPU 110 then repeats the processes from steps S102 to S108 for the logic device LDEV similarly to the processes from steps S93 to S99, and then ends this process.

4A-3. Temporary Ownership Setting Process

Figure 17:
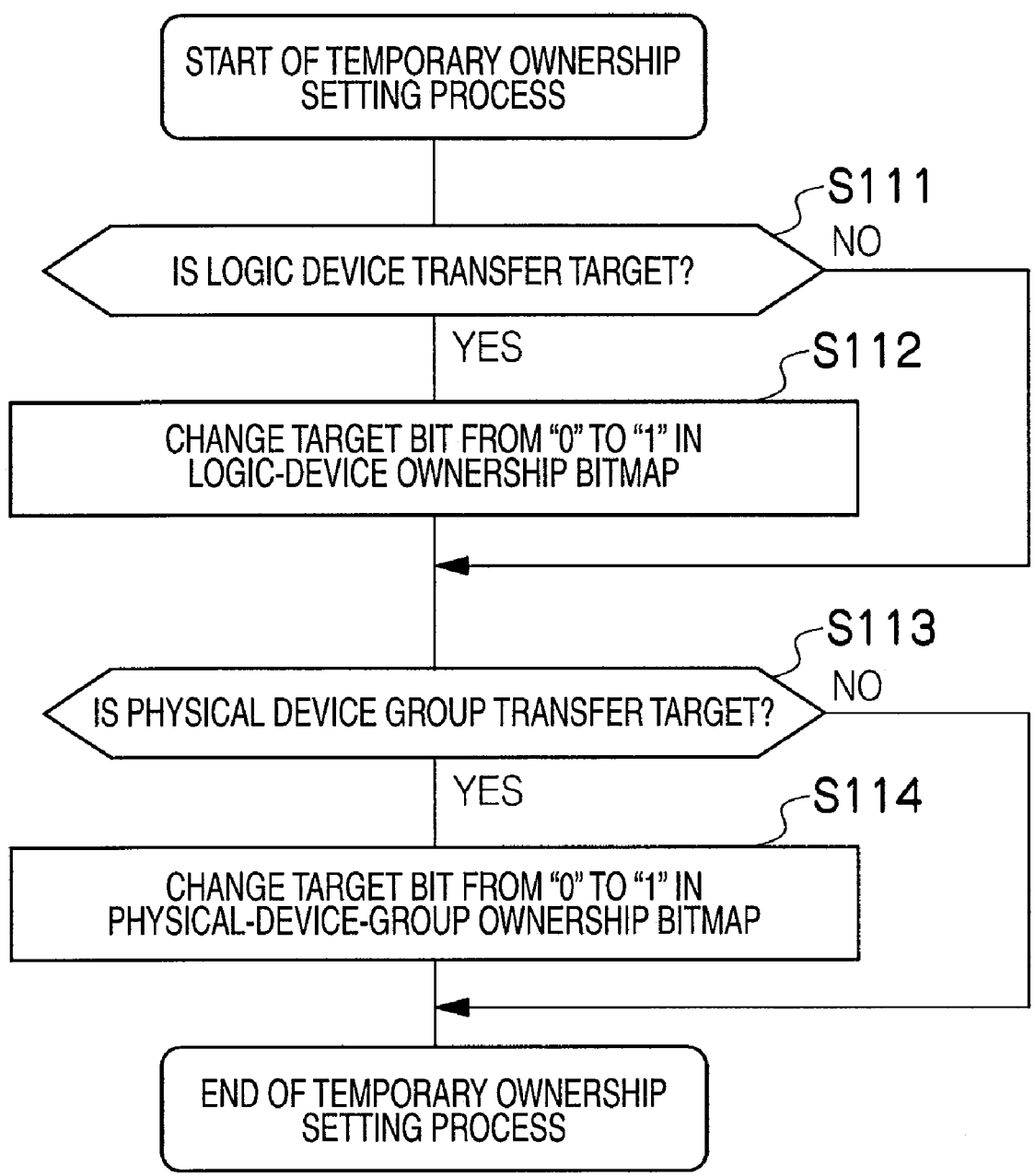
FIG. 17 is a flowchart of a temporary ownership setting process in the embodiment.

By referring to the flowchart of FIG. 17, described next is the temporary ownership setting process of step S25. In this process, the transfer-destination microprocessor 11 is assigned an ownership on a temporary basis, and thus information in the bitmaps on the local memory is changed.

First of all, upon reception of a request notification for temporary ownership transfer from the transfer-source CPU, the transfer-destination CPU 110 starts the temporary ownership setting process.

The transfer-destination CPU 110 then determines whether any of the logic devices LDEV is the transfer target determined in step S22 (S111). When none of the logic devices is the transfer target (S111: NO), the transfer-destination CPU 110 continuously goes through the process of step S113, and when any of the logic devices LDEV is the transfer target (S111: YES), the transfer-destination CPU 110 changes, from "0" to "1", the target bit in the temporary ownership bitmap 17 of the logic device (S112).

The transfer-destination CPU 110 then determines whether any of the physical device groups PDEV-G is the transfer target determined in step S22 (S113). When none of the physical device groups PDEV-G is the transfer target (S113: NO), this is the end of the process.

On the other hand, when any of the physical device groups PDEV-G is the transfer target (S113: YES), the transfer-destination CPU 110 changes, from "0" to "1", the target bit in the temporary ownership bitmap of the physical device group PDEV-G (S114), and this is the end of this process.

4A-4. Temporary Ownership Transfer Process

Figure 18:
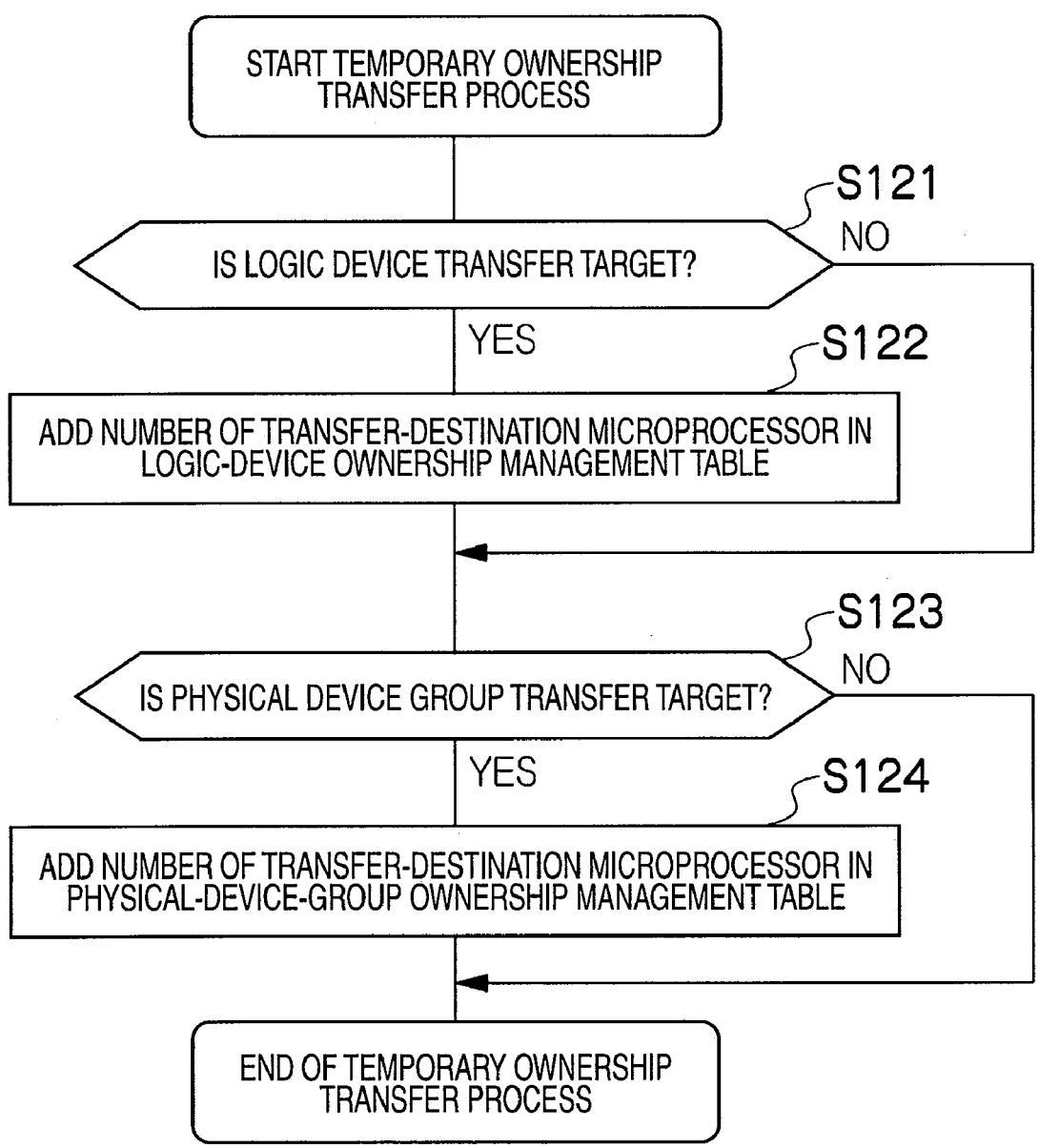
FIG. 18 is a flowchart of a temporary ownership transfer process in the embodiment.

By referring to the flowchart of FIG. 18, described next is the temporary ownership transfer process of step S31. In this process, the transfer-source microprocessor 11 changes information in the tables stored on the shared memory 8.

First of all, the transfer-source CPU 110 determines whether any of the logic devices is the transfer target determined in step S22 (S121). When any of the logic devices is the transfer target (S121: YES), the transfer-source CPU 110 adds the number of thus determined transfer-destination microprocessor into the "temporary ownership MPPK#" field 232 of the logic-device ownership management table 23 (S122). On the other hand, when none of the logic devices is the transfer target (S121: NO), the transfer-source CPU 110 goes through the process of step S123, which will be described later.

The transfer-source CPU 110 then determines whether any of the physical device groups PDEV-G is the transfer target (S123), and when any of the physical device groups PDEV-G is the transfer target (S123: YES), the number of thus determined transfer-destination microprocessor is added into the "temporary ownership MPPK#" field 242 of the physical-device-group ownership management table 24 (S124), and this is the end of this process. Note that, when none of the physical device groups PDEV-G is the transfer target (S123: NO), the transfer-source CPU 110 ends this process as it is.

4A-5. Request Buffer Remaining Process

Figure 19:
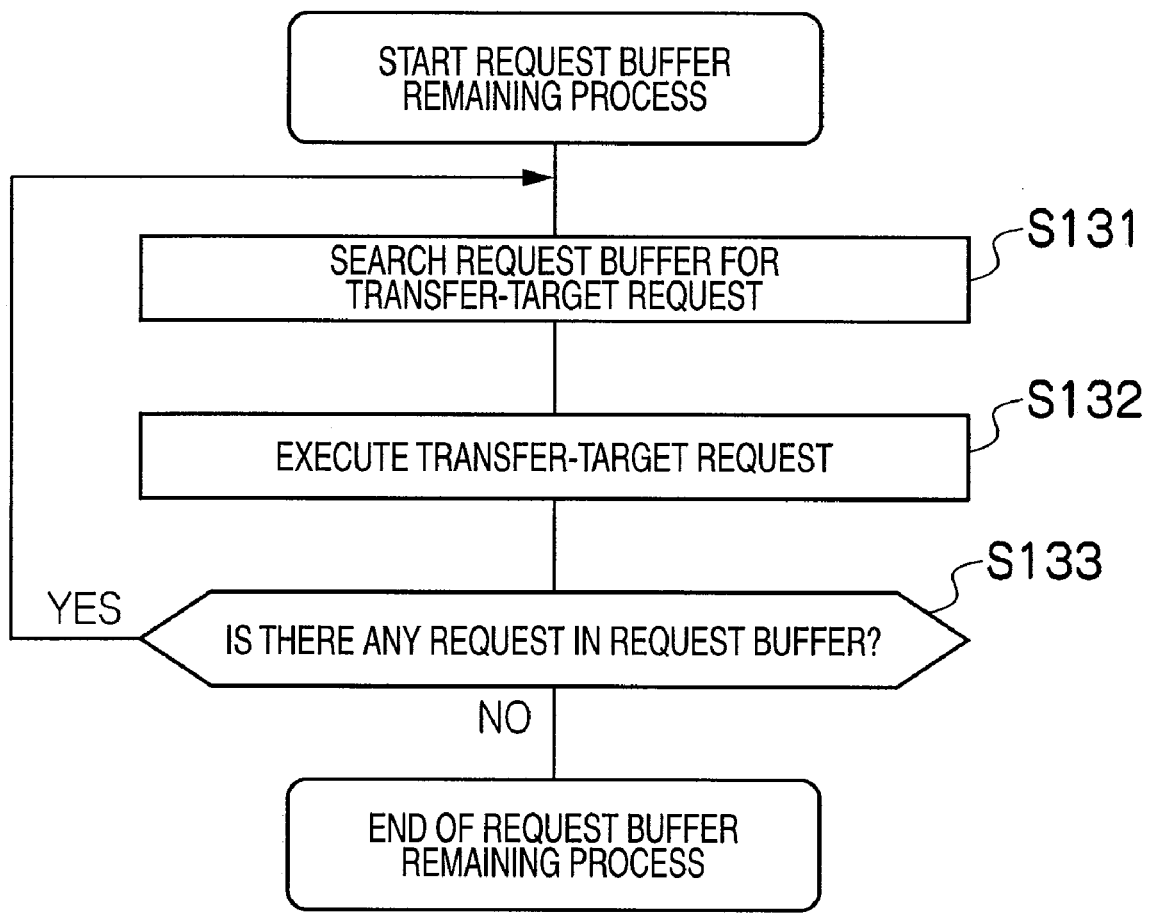
FIG. 19 is a flowchart of a request buffer remaining process in the embodiment.

By referring to the flowchart of FIG. 19, described next is the remaining process of the request buffer 15 in step S32. From the point in time when the notification is provided to tell the ownership change made by the transfer-source CPU 110 in step S28, various requests are started to be temporarily stored on the local memory 111 of the transfer-destination microprocessor 11. The concern here is that the transfer-destination microprocessor 11 is temporarily assigned an ownership, and the transfer-source microprocessor 11 is the one still assigned the ownership. In consideration thereof, there needs to complete the various requests of the transfer target left in the local memory of the transfer-source microprocessor 11.

First of all, after adding the number of the transfer-destination microprocessor 11 into the ownership management table in step S31, the transfer-source CPU 110 starts the remaining process of the request buffer 15.

Figure 20:
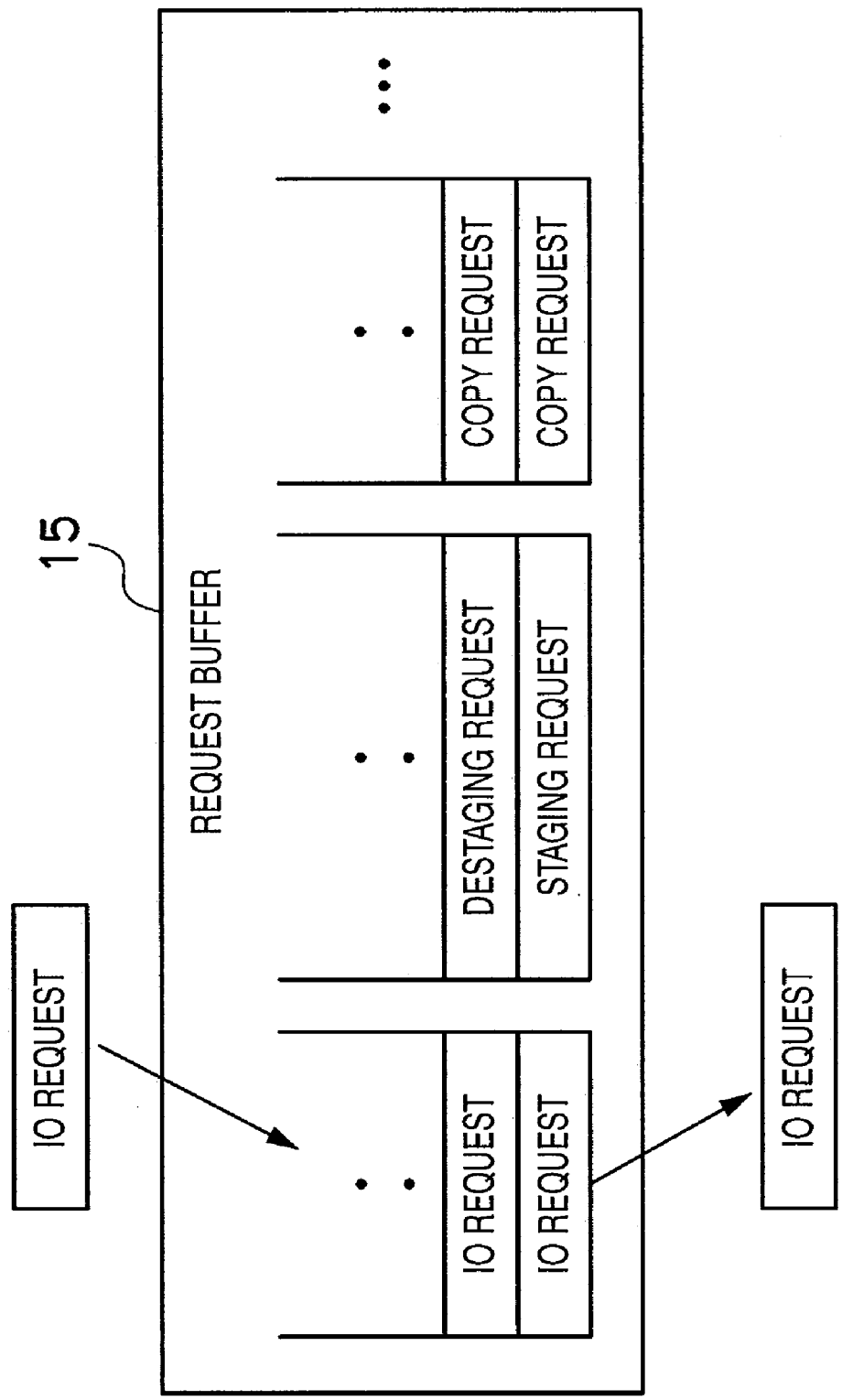
FIG. 20 is an illustration showing the remaining process for the request buffer in the embodiment.

As shown in the diagram of FIG. 20, the transfer-source CPU 110 then searches the various requests temporarily stored in the request buffer 15 for any request related to the transfer-target ownership (S131), and executes thus found request (S132). Thereafter, the transfer-source CPU 110 repeats the remaining process until every request related to the transfer-target ownership in the request buffer 15 is executed (S133: YES), and this is the end of the remaining process of the request buffer 15.

4A-6. Ownership Transfer Execution Process

Figure 21:
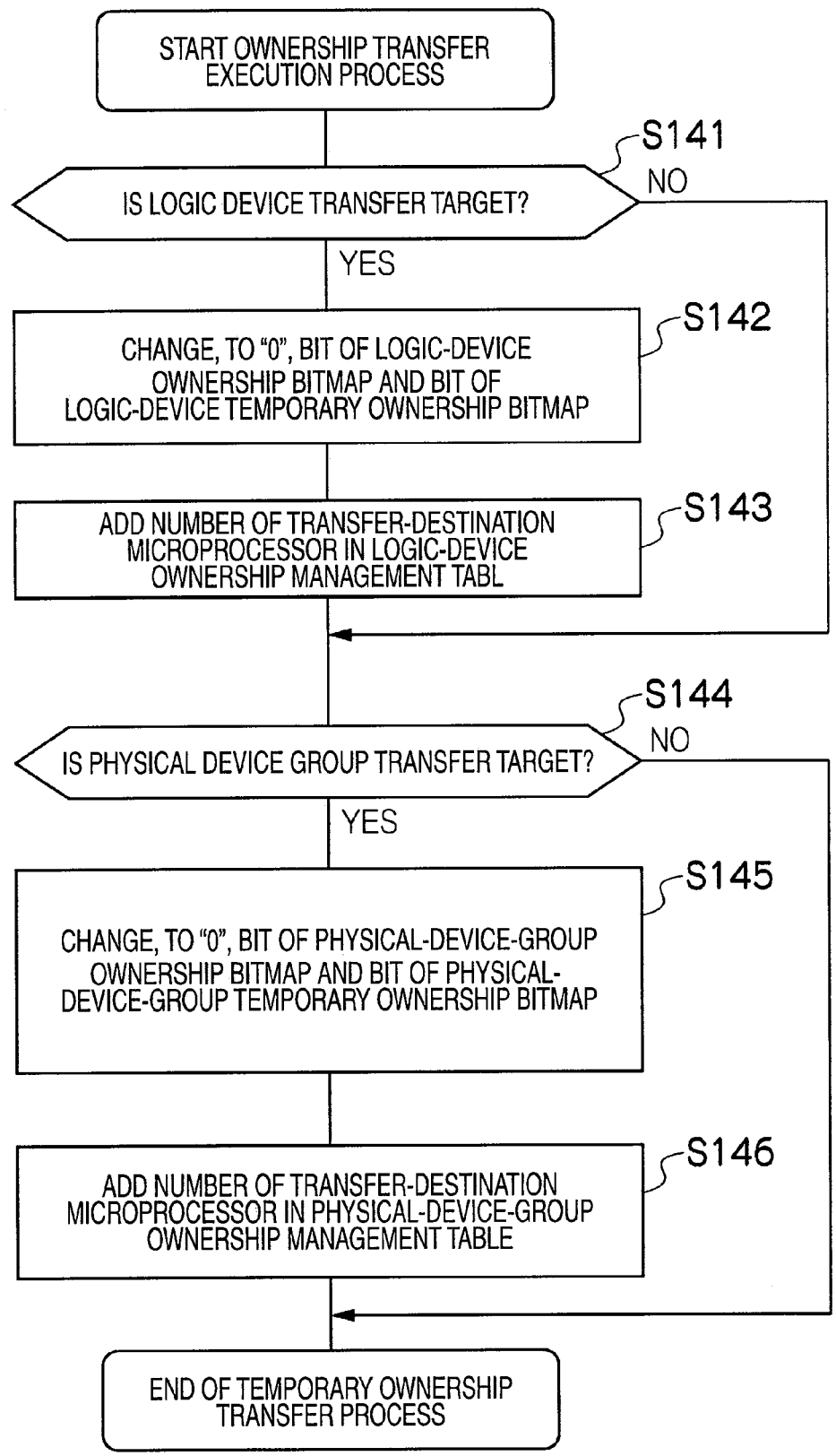
FIG. 21 is a flowchart of an ownership transfer execution process in the embodiment.

By referring to the flowchart of FIG. 21, described next is the ownership transfer execution process of step S33. In this process, the transfer-source microprocessor 11 changes information in the tables and bitmaps on the local memory 111, and changes also information in the tables on the shared memory 8.

First of all, the transfer-source CPU 110 determines whether any of the logic devices LDEV is the transfer target determined in step S22 (S141), and when any of the logic devices LDEV is the transfer target (S141: YES), the target bit in the logic-device ownership bitmap 16 is changed from "1" to "0", and the target bit in the logic-device temporary ownership bitmap 17 is changed from "1" to "0" (S142). Thereafter, the transfer-source CPU 110 adds the number of thus determined transfer-destination microprocessor into the "ownership MPPK#" field 231 of the logic-device ownership management table 23 (S143).

On the other hand, when none of the logic devices is the transfer target (S141: NO), the transfer-source CPU 110 goes through the process of step S144 that will be described later.

The transfer-source CPU 110 then determines whether any of the physical device groups PDEV-G is the transfer target (S144), and when any of the physical device groups PDEV-G is the transfer target (S144: YES), the target bit in the physical-device-group ownership bitmap 18 is changed from "1" to "0", and the target bit in the physical-device-group temporary ownership bitmap 19 is changed from "1" to "0" (S145). Thereafter, the transfer-source CPU 110 adds the number of thus determined transfer-destination microprocessor into the "ownership MPPK#" field 241 of the physical-device-group ownership management table 24 (S146), and this is the end of the process.

Note that, when none of the physical device groups PDEV-G is the transfer target (S144: NO), the transfer-source CPU 110 ends the process as it is.

4A-7 Ownership Setting Process

Figure 22:
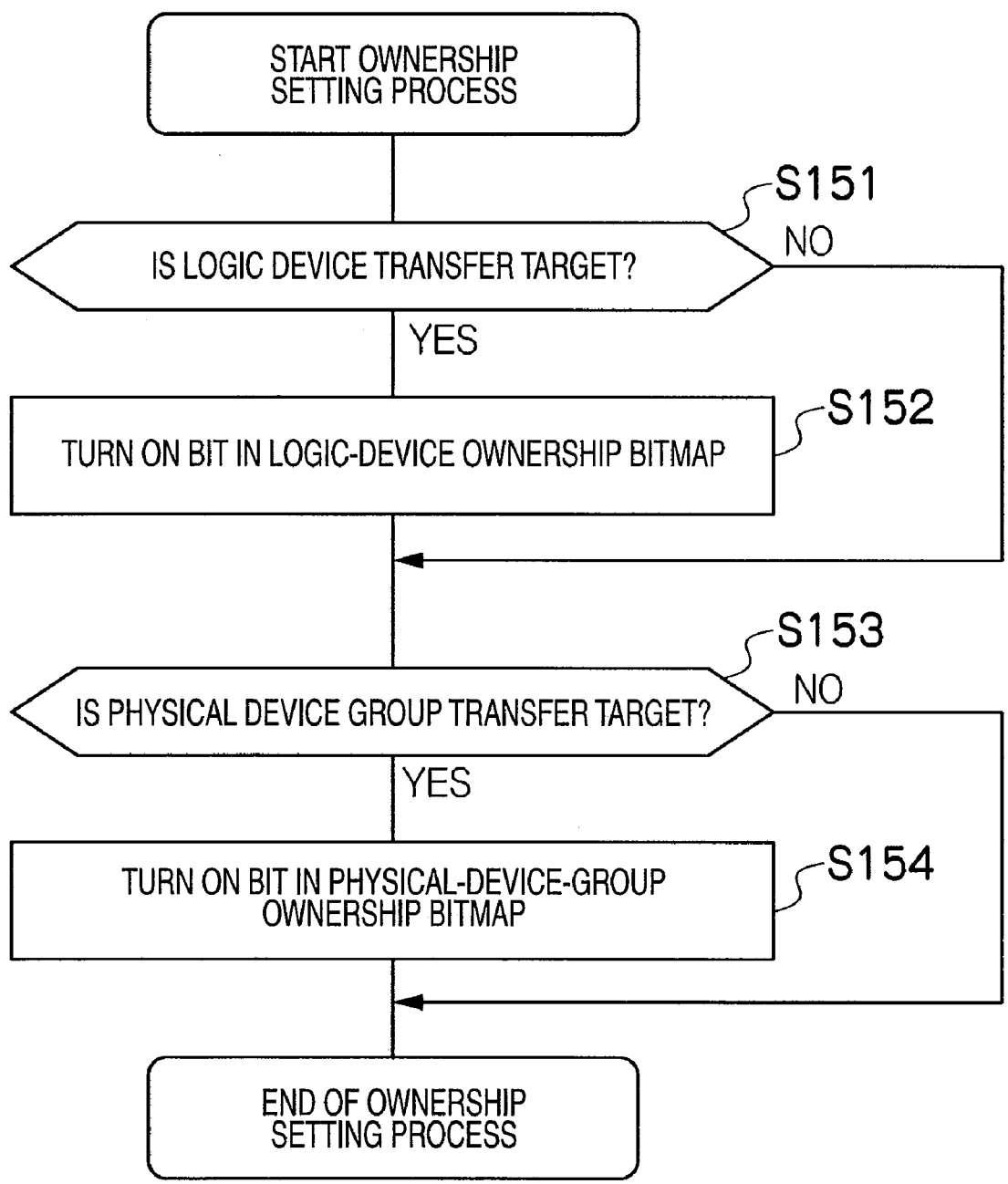
FIG. 22 is a flowchart of an ownership setting process in the embodiment.

By referring to the flowchart of FIG. 22, described next is the ownership setting process of step S35. In this process, the transfer-destination microprocessor 11 changes information in the bitmaps stored on the local memory 111.

The transfer-source CPU 110 determines whether any of the logic devices is the transfer target determined in step S22 (S151), and when any of the logic devices is the transfer target (S151: YES), the target bit in the logic-device ownership bitmap 16 is changed from "0" to "1" (S152).

On the other hand, when none of the logic devices is the transfer target (S151: NO), the transfer-destination CPU 110 goes through the process of step S153 that will be described later.

Next, the transfer-destination CPU 110 determines whether any of the physical device groups PDEV-G is the transfer target (S153), and when any of the physical device groups PDEV-G is the transfer target (S153: YES), the target bit in the physical-device-group ownership bitmap 18 is changed from "0" to "1" (S154), and this is the end of this process.

Note that, when none of the physical device groups PDEV-G is the transfer target (S153: NO), the transfer-destination CPU 110 ends this process as it is.

As such, with the transfer process executed as in the embodiment, ownership transfer can be performed with a consideration given to the correlation among various factors of the storage device 4, e.g., the correlation between an arbitrary logic device and other logic devices, and the correlation between the data input/output process and other processes.

4A-8. Buffer Process of Request Buffer

Figure 23:
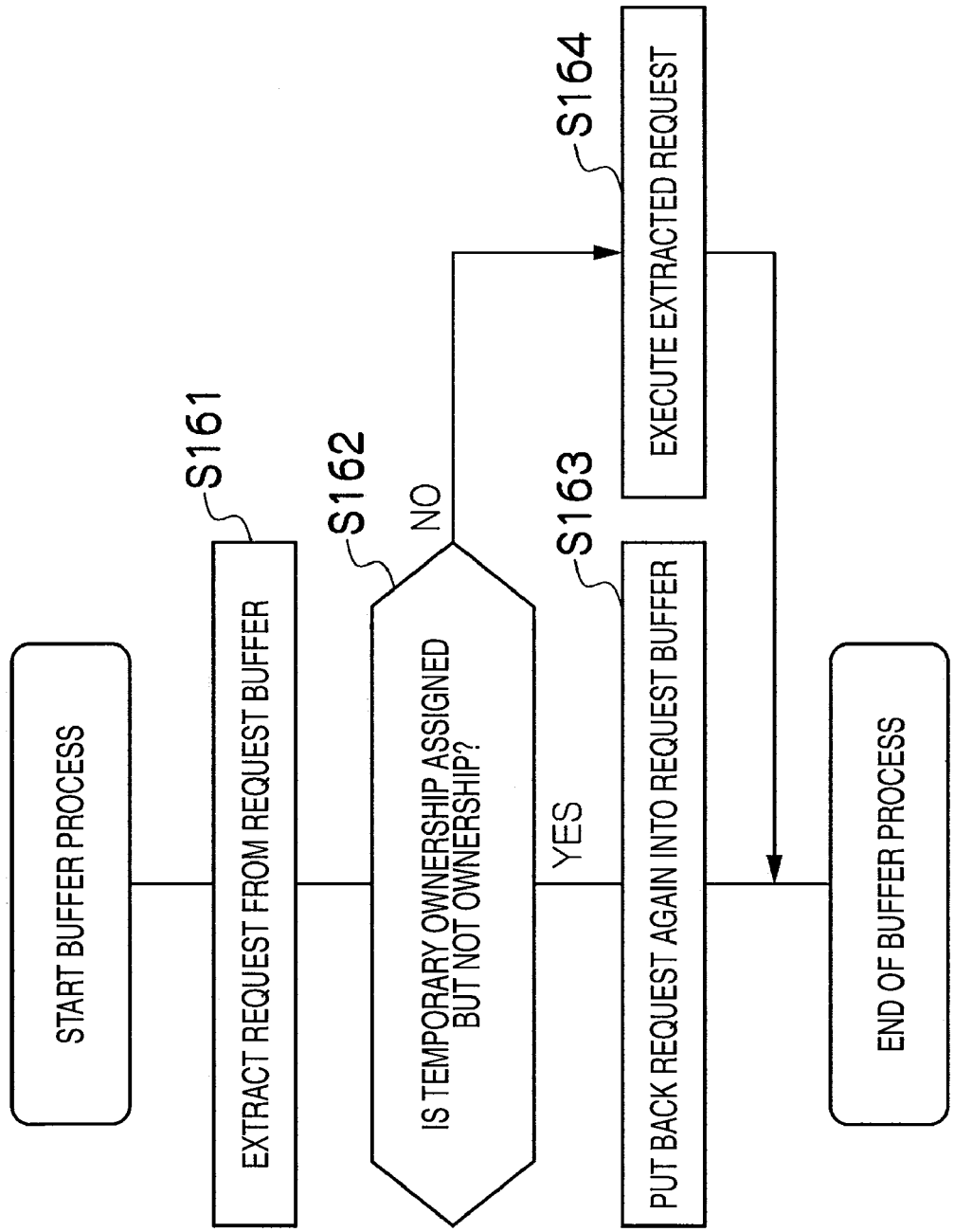
FIG. 23 is a flowchart of a buffer process in a request buffer in the embodiment.
Figure 24:
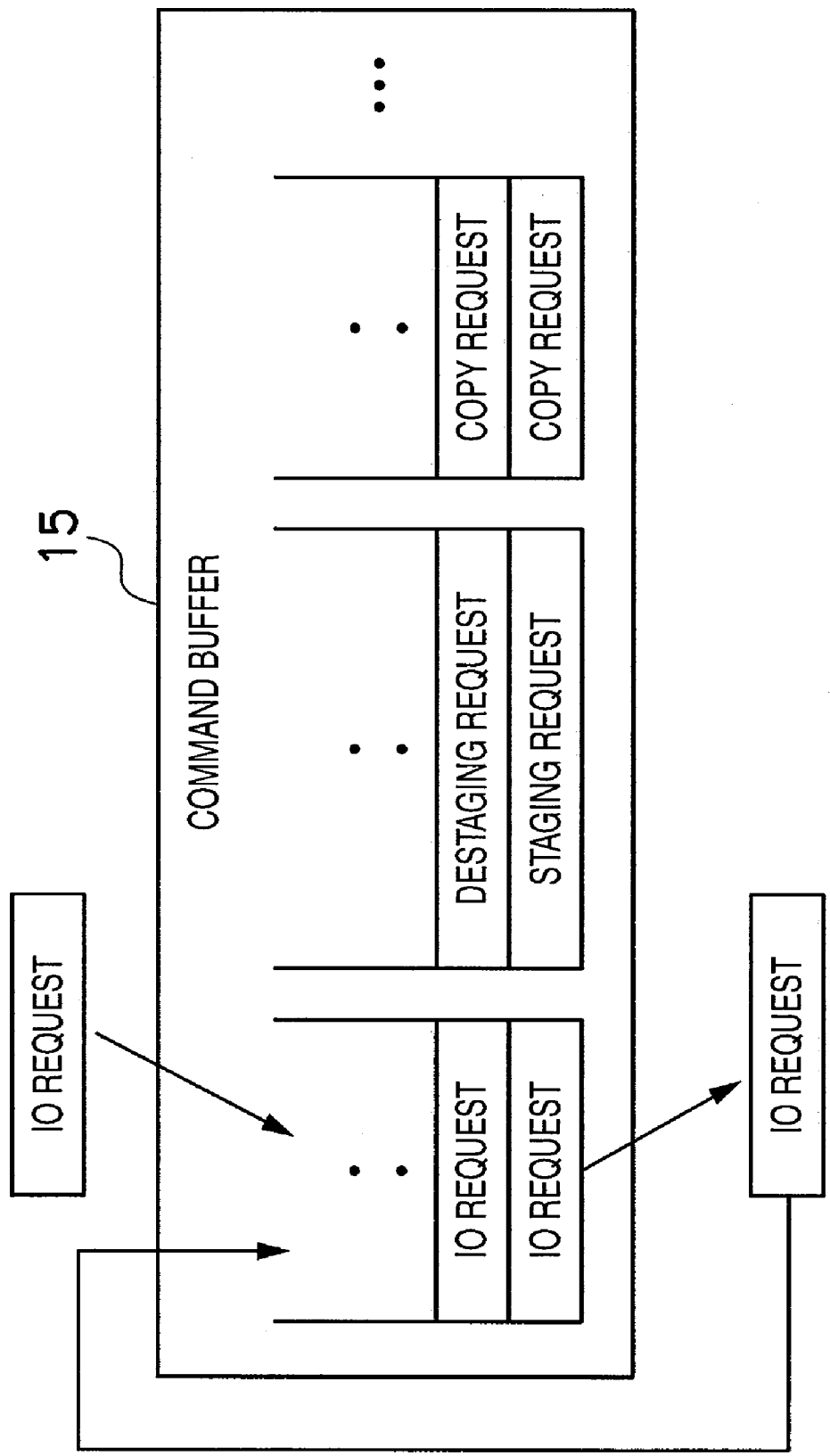
FIG. 24 is an illustration showing the buffer process in the request buffer in the embodiment.

By referring to the flowchart of FIG. 23 and the diagram of FIG. 24, described next is a buffer process of the request buffer 15 to be executed by the transfer-destination microprocessor 11. The transfer-destination CPU executes the process in the request buffer 15 on a regular basis.

First of all, the transfer-destination CPU 110 extracts an arbitrary request from the request buffer 15 (S161). When the extracted request is a transfer target assigned a temporary ownership, i.e., target bit in the temporary ownership bitmap is "1", or when the extracted request is a transfer target not yet completely assigned an ownership, i.e., target bit in the ownership bitmap is "0" (S162: YES), the extracted request is put back into the request buffer 15 again (S163), and this process is ended.

On the other hand, when the extracted request is a transfer target assigned a temporary ownership, i.e., target bit in the temporary ownership bitmap is "1", or when the extracted request is a transfer target also assigned an ownership, i.e., target bit in the ownership bitmap is "1" (S162: NO), the transfer-destination CPU 110 extracts the extracted request (S164), and this process is ended.

As such, for putting back the extracted request into the request buffer 15 again (S163), the process is in the state from the point in time when the channel adaptor group is notified of the ownership change of the logic device to the point in time when the transfer-destination CPU 110 is notified of the completion of ownership transfer (denoted by A in FIG. 8).

Moreover, for executing the extracted request (S164), the process is in the state after the transfer-destination microprocessor 11 is formally assigned an ownership (denoted by B in FIG. 8).

4B. Transfer Process Based on User Destination

Described next is a case where the microprocessors 11 execute an ownership process based on user designation.

4B-1. Transfer Process by Transfer Unit

Figure 25:
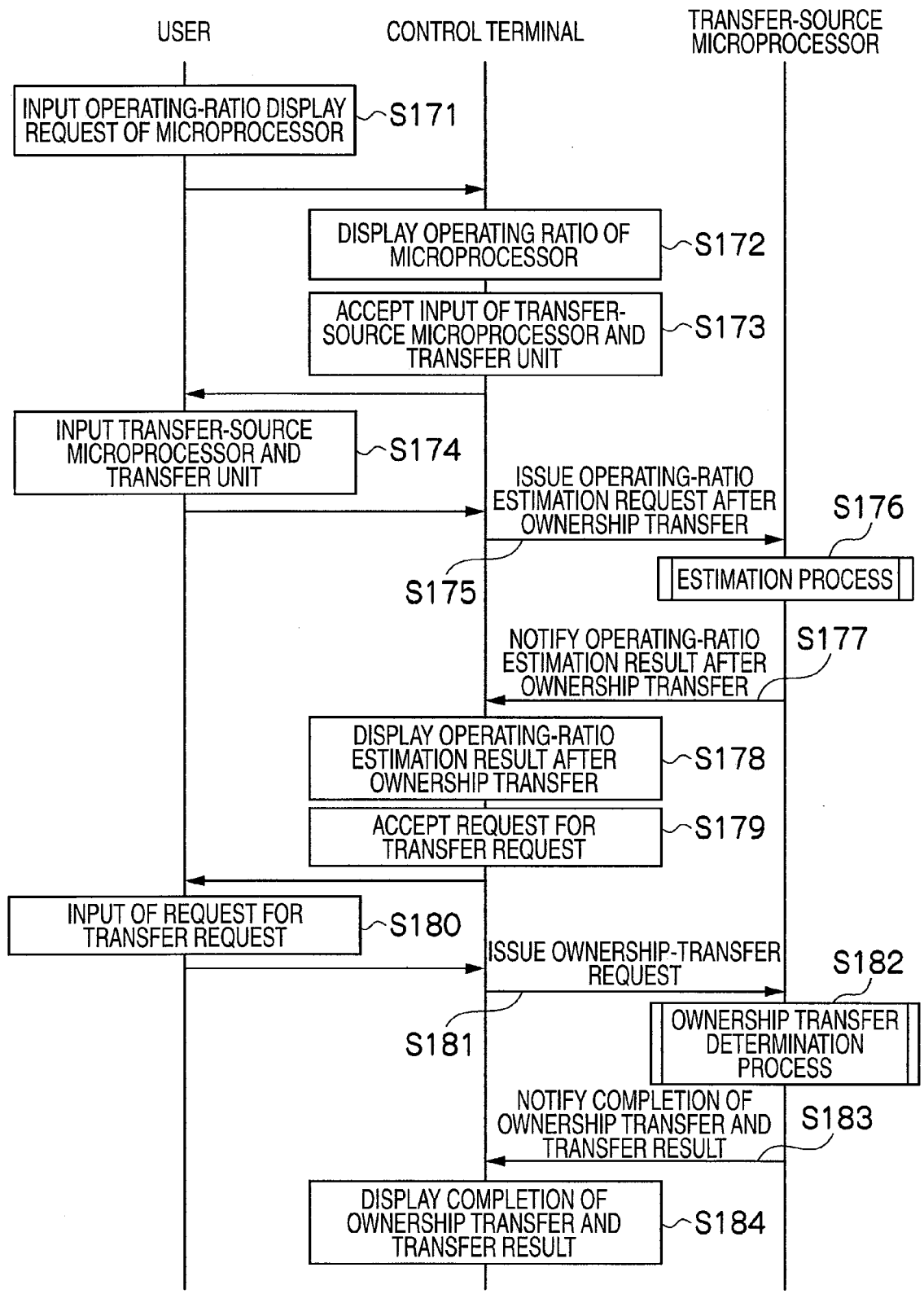
FIG. 25 is a flowchart of the ownership transfer process to be executed by a transfer unit based on a user designation.

By referring to the flowchart of FIG. 25, described now is an ownership transfer process by a transfer unit based on user designation. The ownership transfer process is executed by the microprocessors 11 on a regular basis based on the ownership transfer program (not shown).

First of all, when a user inputs a command for displaying the operating ratios of the microprocessors 11 on a screen S of the control terminal 5 (S171), the control terminal calls the current operating ratios of the microprocessors 11 from the microprocessor-operating-ratio management table 22 for display on the screen (S172). FIG. 26 shows the screen view of the control terminal 5. When the user inputs an operating-ratio display command C1 of "% MPPK" to the screen, for example, as a screen S1, the operating ratios of all of the microprocessors 11 are output. In response, the control terminal 5 accepts inputs of the transfer-source microprocessor 11 and a transfer unit (S173). As shown in FIG. 26, when the user inputs a command C2 of "% MOVEOWNER" to the screen, for example, a message M1 is output to tell "Designate microprocessor number for ownership transfer". The user sees the provided operating ratios to input the number of any microprocessor for load reduction. Thereafter, a message M2 is output to tell that "Select transfer unit for transfer", and thus the user selects, for input, any desired transfer unit from a "logic set unit", a "physical set unit" and a "logic device unit" (S174).

Upon reception of the input number, the control terminal 5 issues an estimation request toward the transfer-source microprocessor 11 (S175). This estimation request is for estimating the operating ratio of the transfer-source microprocessor 11 after ownership transfer (S175).

After receiving the estimation request as such, the transfer-source microprocessor 11 executes an estimation process that will be described later (S176), and notifies the estimation result to the control terminal (S177).

Upon reception of the estimation result, the control terminal displays the estimation result on the screen (S178), and asks a user about the ownership transfer (S179). For example, as with a message M3 telling as "Estimated operating ratios after ownership transfer are as below", in FIG. 26, the control terminal 5 displays, on a screen S2, the operating ratios of all of the microprocessors 11 after transferring the user's desired transfer unit to any other microprocessor 11. The control terminal 5 then asks the user about the ownership transfer as a message M4 asking as "Transfer? Y/N".

With a user's input of Yes for transfer request (S180), the control terminal 5 issues an ownership transfer request to the transfer-source microprocessor 11 (S181).

After receiving the transfer request as such, the transfer-source microprocessor 11 executes an ownership transfer determination process (S182). In the ownership transfer determination process, because the user is asking for ownership transfer by a transfer unit (S41: YES), the transfer-source microprocessor 11 goes through the processes from step S41 to S48. The transfer-source microprocessor 11 notifies the control terminal of the completion of the ownership transfer and the resulting operating ratio after the ownership transfer (S183). After displaying, for the user, the completion of the ownership transfer and the resulting operating ratio after the ownership transfer (S184), the control terminal 5 ends this process. For example, in FIG. 26, a message telling as "Completion of transfer" is displayed on the screen, and the operating ratios of all of the microprocessors 11 after the ownership transfer are displayed on a screen S3.

4B-1-1. Estimation Process

Figure 27:
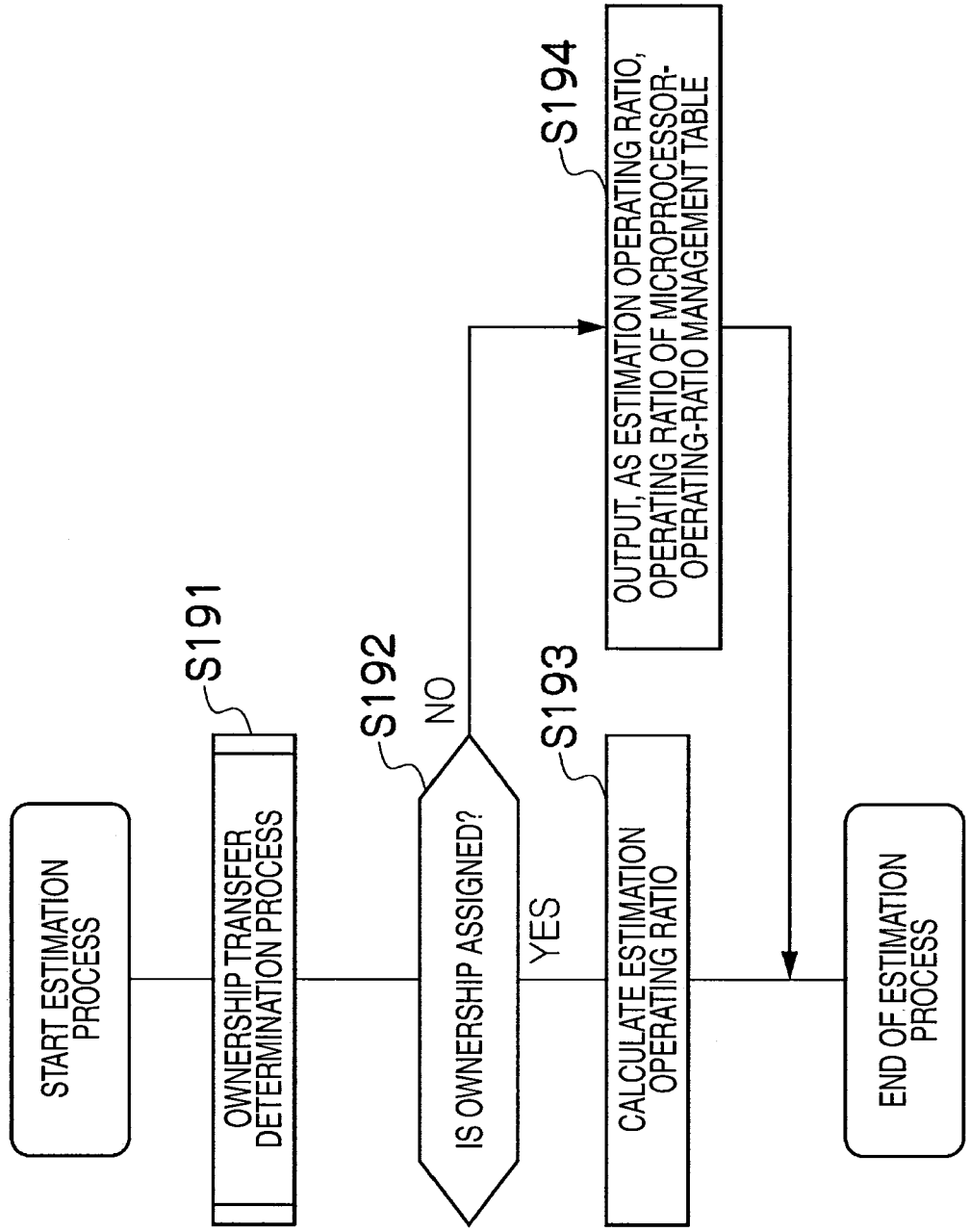
FIG. 27 is a flowchart of an estimation process in the embodiment.

By referring to the flowchart of FIG. 27, described next is the estimation process of step S176. The estimation process is executed by the transfer-source CPU 110 based on the ownership transfer program (not shown).

The transfer-source CPU 110 executes the ownership transfer determination process (S191). To be specific, because the user has designated ownership transfer by a transfer unit, the transfer-source CPU 110 executes the processes from steps S41 to S48. When the transfer-source microprocessor 11 has an ownership of the user's desired transfer unit (S192: YES), the transfer-source CPU 110 calculates an estimation operating ratio (S193). When the transfer unit desired by the user has an operating ratio of 20%, for example, the transfer-source CPU 110 refers to the microprocessor-operating-ratio table for the current microprocessor 11 to calculate an operating ratio by subtracting 20% from the operating ratio of the transfer-source microprocessor 11, and then calculates an operating ratio by adding 20% to the operating ratio of the microprocessor determined as the transfer destination.

The transfer-source CPU 110 outputs the operating ratios of all of the microprocessors 11 including such operating ratios as an estimation operating ratio, and this is the end of the process.

On the other hand, when the transfer-source microprocessor 11 has no ownership of the user's desired transfer unit (S192: NO), the transfer-source CPU 110 outputs the operating ratios found in the microprocessor-operating-ratio management table 22 for the current microprocessor as an estimation operating ratio (S194), and this is the end of the process.

As such, with inputs of the transfer-source microprocessor 11 and a transfer unit, a search can be made for the transfer-destination microprocessor 11 on the side of the storage device 4, and the operating ratio of the transfer unit can be transferred to the transfer-destination microprocessor 11. Moreover, even before ownership transfer, only with a user's input of a transfer unit, the operating ratio after the ownership transfer can be calculated in advance, thereby being able to visually estimate the load of the microprocessor 11 after ownership transfer.

4B-2. Transfer Process with User Designated Transfer Target

Figure 28:
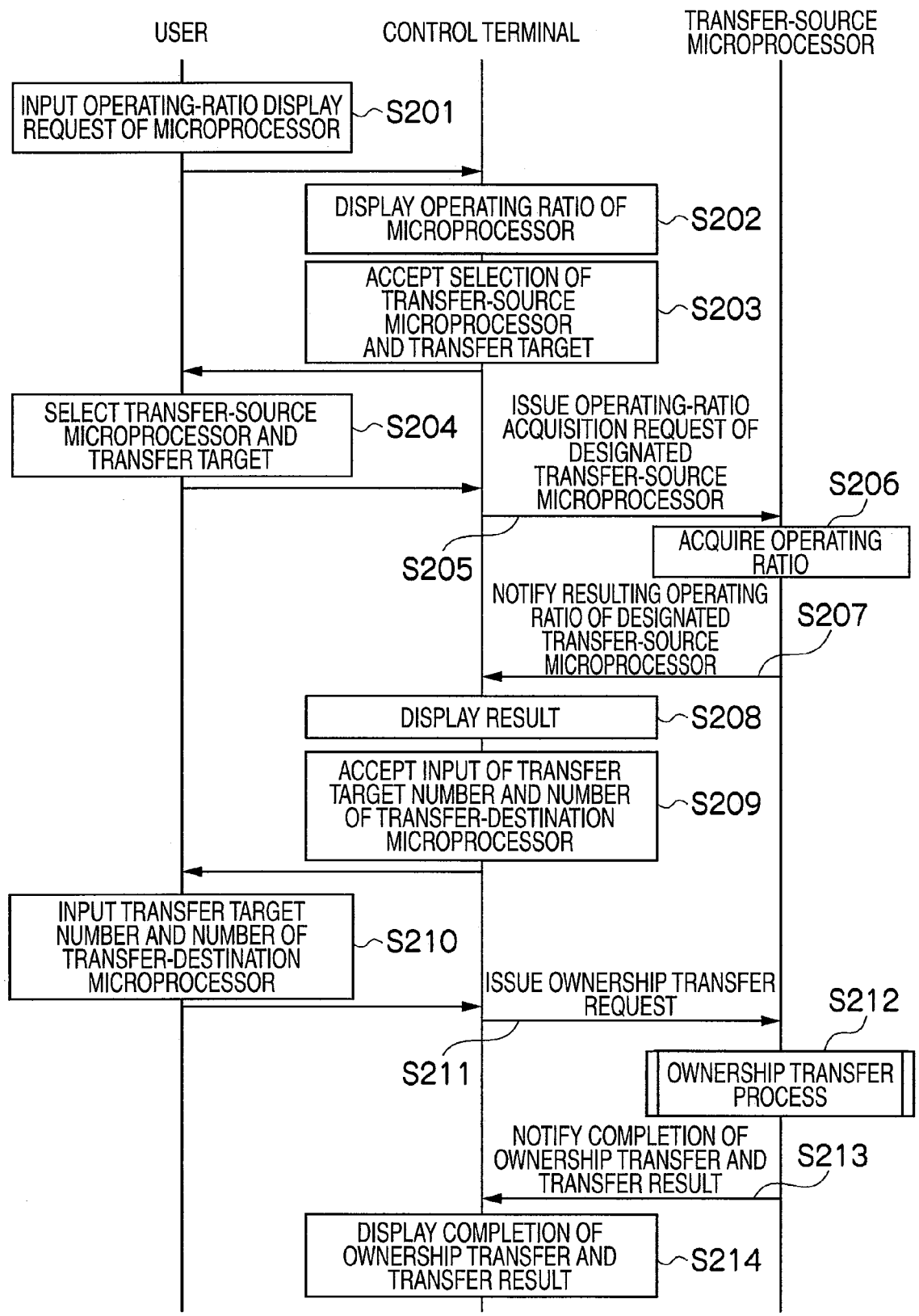
FIG. 28 is a flowchart of the ownership transfer process to be executed based on a transfer target designated by a user.

By referring to the flowchart of FIG. 28, described next is an ownership transfer process for a user's desired transfer target. Such an ownership transfer process is executed by the microprocessors 11 on a regular basis based on the ownership transfer program (not shown).

First of all, when a user inputs a command for displaying the operating ratios of all of the microprocessors 11 on the screen of the control terminal 5 (S201), the control terminal 5 calls the current operating ratios of the microprocessors 11 from the microprocessor-operating-ratio management table 22 for display on the screen (S202). FIG. 29 shows the screen view of the control terminal 5. When the user inputs an operating-ratio display command C3 of "% MPPK" to the screen, for example, as a screen S4, the operating ratios of all of the microprocessors 11 are output. In response, the control terminal 5 accepts an input of the transfer-destination microprocessor 11 and a selection of the user's desired transfer unit (S203). As shown in FIG. 29, when the user inputs an ownership transfer command C4 of "% MOVEOWNER-A" to the screen, for example, a message M6 is output to tell "Designate the microprocessor number for ownership transfer". The user sees the provided operating ratios to input the number of any microprocessor for load reduction. Thereafter, a message M7 is output to tell "Select transfer unit for transfer", and thus the user selects, for input, any desired transfer target from a "physical group", a "logic group" and a "logic device" (S204). On the exemplary screen of FIG. 29, the user selects the "logic device" as a transfer target.

The control terminal 5 issues an acquisition request to the designated transfer-source microprocessor 11 to acquire an operating ratio of the user's desired transfer target (S205).

After receiving the acquisition request as such, the transfer-source microprocessor 11 acquires an operating ratio of the user's desired transfer target (S206). The operating ratio is acquired from the operating ratio tables 12 to 14 of the user's desired transfer target. On the exemplary screen of FIG. 29, because the user has selected a logic device as a transfer target, the operating ratios of the logic devices are extracted from the logic-device operating table 12 for output to a screen S5. The transfer-source microprocessor 11 notifies the control terminal 5 of the resulting operating ratios of the designated transfer target (S207).

Upon reception of the resulting operating ratios of the designated transfer target, the control terminal 5 displays the result on the screen (S208), and accepts inputs of the user's desired transfer target number and the transfer-designation microprocessor number (S209). For example, the transfer-source microprocessor 11 acquires the operating ratio of any user's desired logic device from the logic-device operating ratio table, and forwards thus acquired result to the control terminal 5. The control terminal 5 displays the resulting operating ratio on the screen. The exemplary screen of FIG. 29 displays thereon the operating ratio of the logic device under the ownership of the microprocessor 11"2". The control terminal 5 outputs a message M8 of "Designate transfer logic device" and a message M9 of "Designate MPPK# of transfer destination", and accepts the user's input. On the exemplary screen of FIG. 29, the logic device "2" is input as a transfer target, and "3" is input as the transfer-destination microprocessor. The control terminal 5 asks the user about the ownership transfer such as a message M10, i.e., "Transfer? Y/N".

After the user's input of the transfer target number and the number of the transfer-destination microprocessor as such (S210), the control terminal 5 issues an ownership transfer request to the transfer-source microprocessor 11 (S211).

Upon reception of the transfer request as such, the transfer-source microprocessor 11 executes an ownership transfer determination process (S212). In the ownership transfer determination process, because the user is asking for ownership transfer by a transfer target designated by himself or herself (S41: NO), the transfer-source microprocessor 11 executes the processes from steps S49 to S51. The transfer-source microprocessor 11 notifies the control terminal 5 of the completion of the ownership transfer and the resulting operating ratio after the ownership transfer (S213). After displaying the user the completion of the ownership transfer and the resulting operating ratio after the ownership transfer (S214), the control terminal 5 ends this process. On the exemplary screen of FIG. 29, for example, a message M11 of "Transfer completed" is displayed on the screen, and the operating ratios of all of the microprocessors 11 after the ownership transfer are displayed on a screen S6.

As such, because the transfer-source microprocessor 11 can output the operating ratio of a transfer target, the load of the microprocessor 11 after ownership transfer can be visually estimated.

5. Ownership Process as a Result of Component Increase/Decrease

Described next is an ownership process as a result of component increase/decrease in the storage device 4. An ownership process and an ownership entry process below are both executed by the microprocessors 11 based on an ownership program (not shown).

5-1. Ownership Process for Attachment of Channel Adaptor

Figure 30:
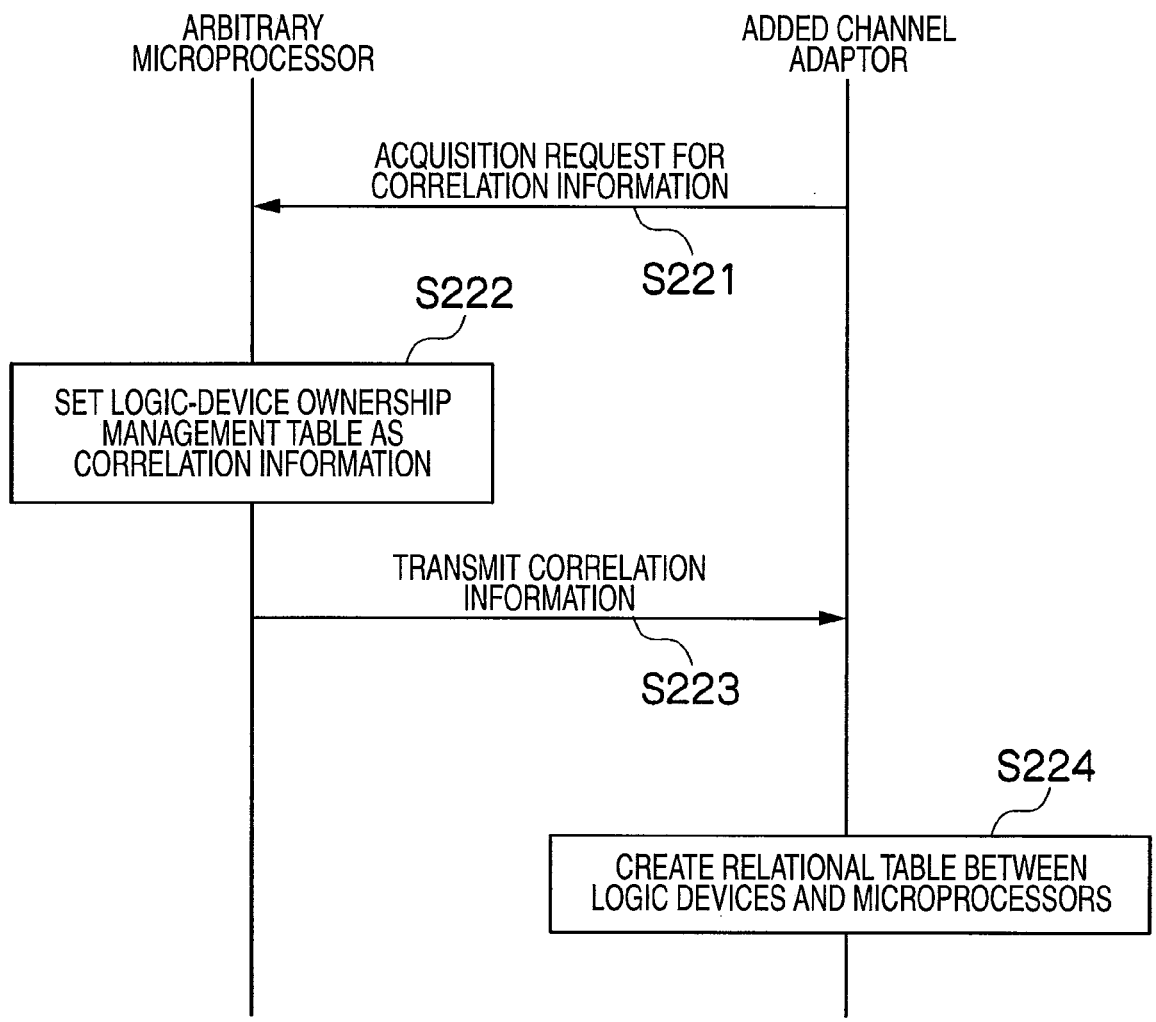
FIG. 30 is a flowchart of an ownership process during attachment of a channel adaptor in the embodiment.

By referring to the flowchart of FIG. 30, described first is an ownership process for attachment of the channel adaptors 6 in the storage device 4.

First of all, any newly-attached channel adaptor 6 (hereinafter, referred to as added channel adaptor 6) issues an acquisition request to an arbitrary microprocessor 11 asking for acquisition of correlation information between the logic devices and the microprocessors 11 (S221). In response thereto, the arbitrary microprocessor 11 sets, to a transmission frame, the correlation information from the logic-device ownership management table 23 (S222). The correlation information is the one between the logic devices LDEV and any of the microprocessors 11 having a temporary ownership with respect to the logic devices. The arbitrary microprocessor 11 transmits the transmission frame set with the correlation information as such to the added channel adaptor 6 (S223). After acquiring the correlation information, the added channel adaptor 6 creates the relational table 610 based on the correlation information (S224), and this is the end of the process.

Note that, for removing an arbitrary channel adaptor 6 from the channel adaptor group, no such process for attachment is required.

5-2. Ownership Process for Removal of Microprocessor

Figure 31:
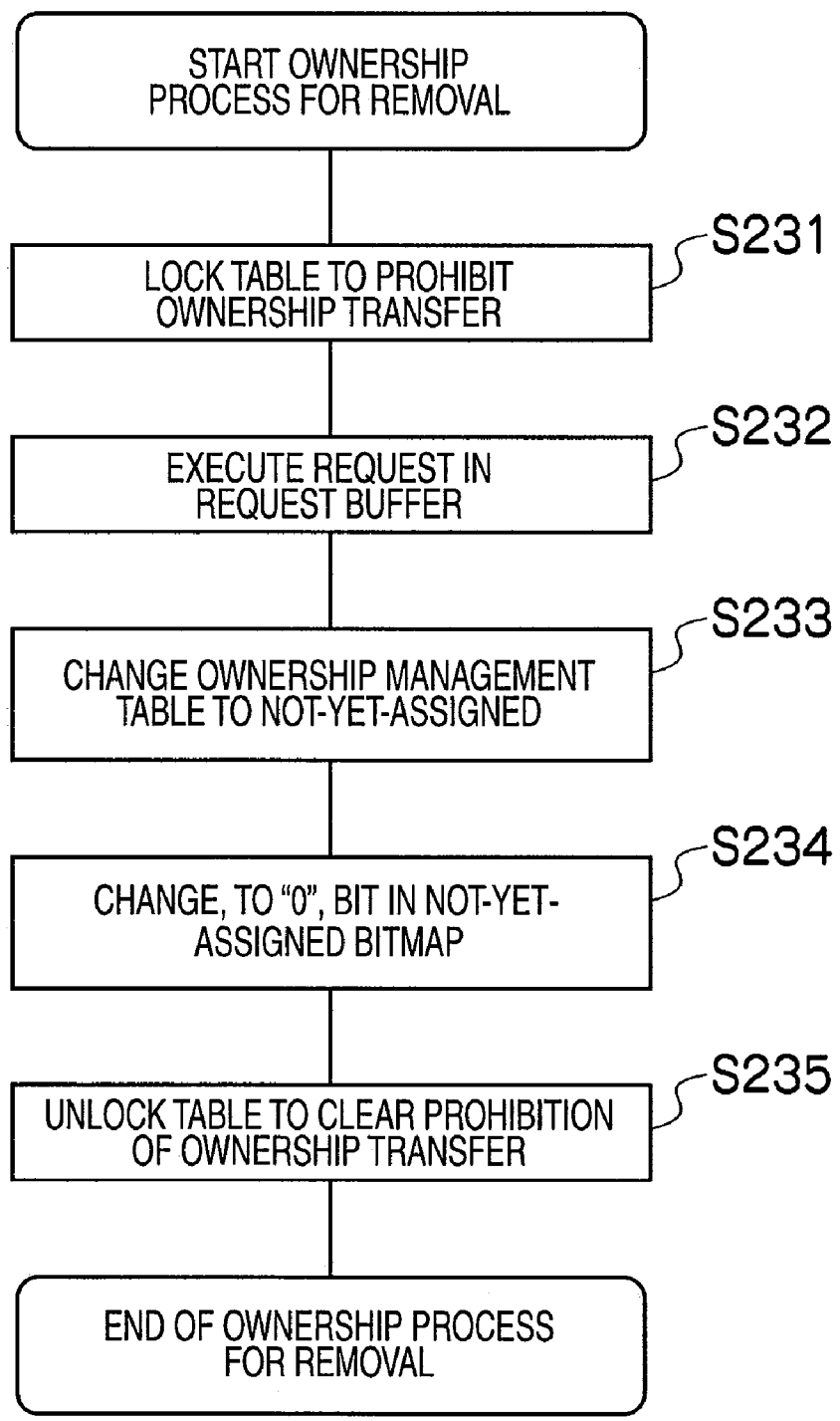
FIG. 31 is a flowchart of the ownership process during removal of a microprocessor in the embodiment.

By referring to the flowchart of FIG. 31, described next is an ownership process for removing an arbitrary microprocessor 11 in the storage device 4.

First of all, the microprocessor 11 to be removed locks the ownership-transfer lock table 26 to prohibit ownership transfer by adding the number of its own number in the table (S231), then executes the process of request(s) stored in the request buffer 15 (S232). The removal-target microprocessor 11 then changes the contents of the ownership management table (S233). To be specific, when the logic-device ownership management table 23 manages the logic device(s) under the ownership of the removal-target microprocessor 11, any corresponding portion in the "ownership MPPK#" field 231 of the table 23 and that in the "temporary ownership MPPK#" field 232 thereof are made not-yet-assigned. Moreover, when the physical-device-group ownership management table 24 manages the physical device group(s) PDEV-G under the ownership of the removal-target microprocessor 11, any corresponding portion in the "ownership MPPK#" field 241 of the table 24, and that in the "temporary ownership MPPK#" field 242 thereof are made not-yet-assigned.

Thereafter, the removal-target microprocessor 11 turns on, to "0", any corresponding bit in the not-yet-assigned logic-device bitmap 27, and that in the not-yet-assigned physical-device-group bitmap 28 (S234), and then unlock the ownership-transfer lock table 26 to clear the prohibition of ownership transfer by deleting its own number from the table (S235). This is the end of the process.

5-3. Ownership Process for Creating Logic Device or Physical Device Group

Figure 32:
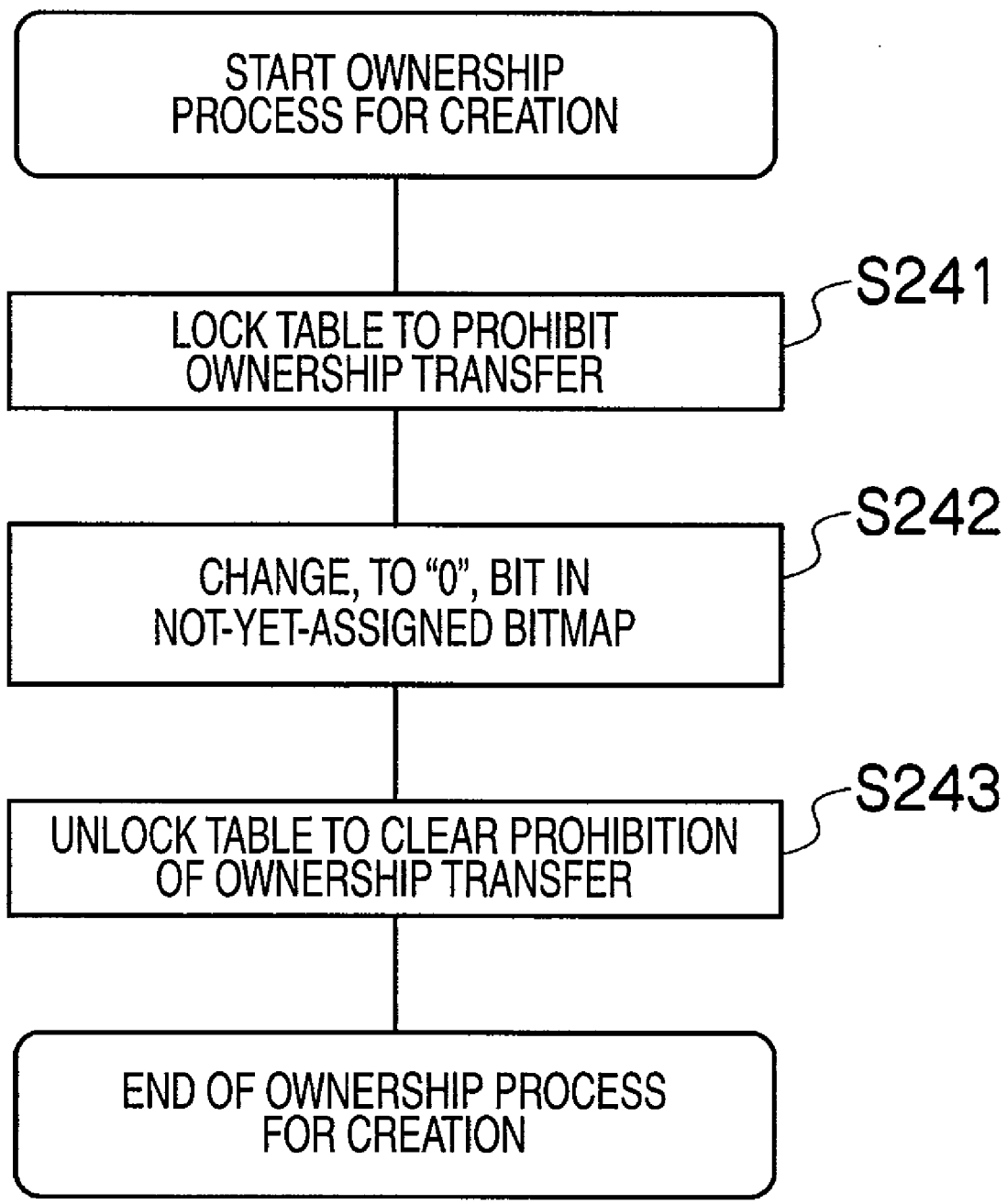
FIG. 32 is a flowchart of the ownership process during creation of a logic device or a physical device group in the embodiment.

By referring to the flowchart of FIG. 32, described next is an ownership process for newly creating a logic device LDEV or a physical device group PDEV-G in the storage device 4.

First of all, when a logic device LDEV or a physical device group PDEV-G is newly created in the storage device 4, an arbitrary microprocessor 11 executes an ownership process.

The CPU 110 of the arbitrary microprocessor 11 (hereinafter, simply referred to as arbitrary CPU) locks the ownership-transfer lock table 26 to prohibit ownership transfer by adding the number of the microprocessor 11 of its own (S241), and the target bit in the not-yet-assigned logic-device bitmap 27 or that in the not-yet-assigned physical-device-group bitmap 28 is turned on to "1", thereby making an entry of not-yet-assigned (S242). Thereafter, the arbitrary CPU 110 unlocks the ownership-transfer lock table 26 to clear the prohibition of ownership transfer by deleting the number of the microprocessor 11 of its own from the table (S243). This is the end of the process.

Figure 33:
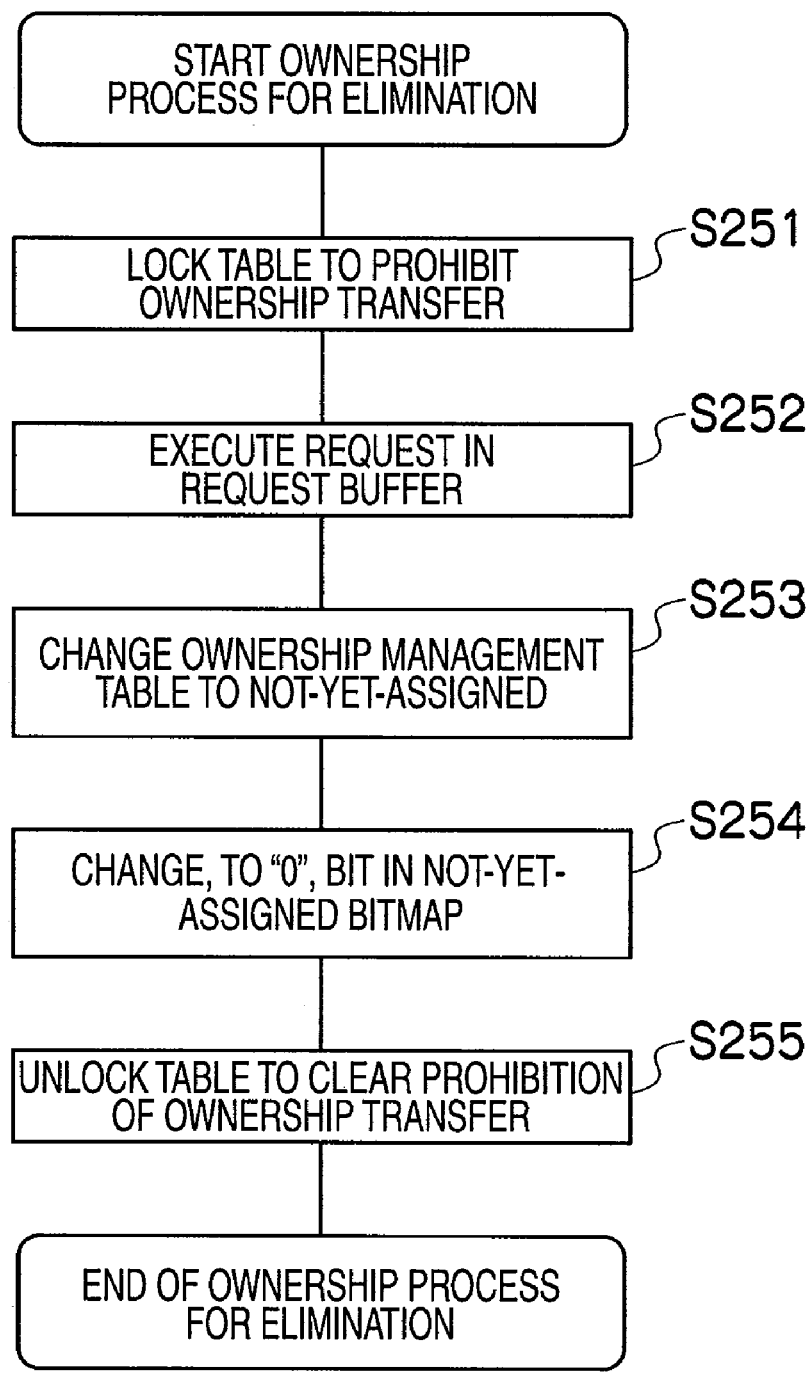
FIG. 33 is a flowchart of the ownership process during elimination of a logic device or a physical device group in the embodiment.
Figure 34:
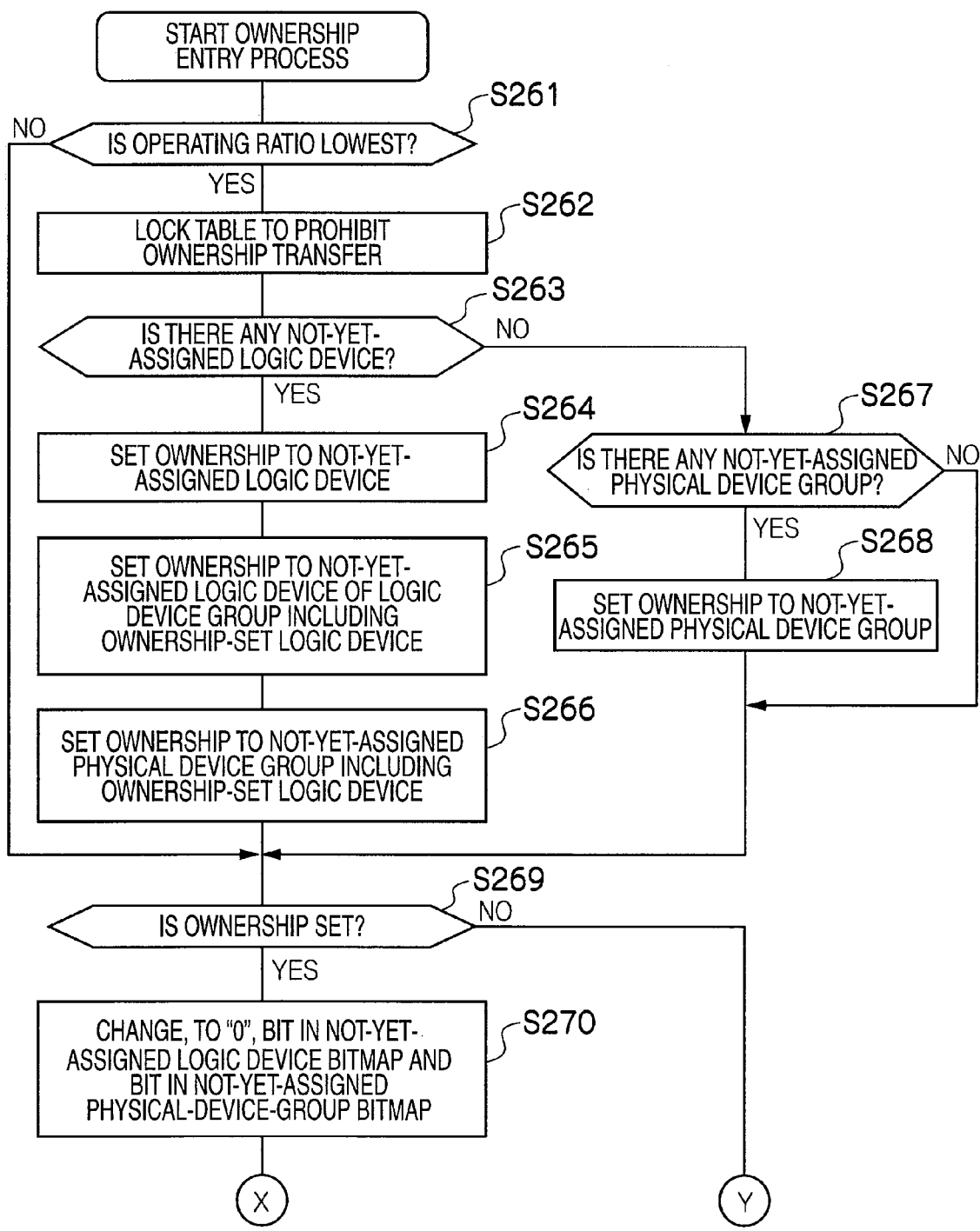
FIG. 34 is a flowchart of an ownership entry process in the embodiment.
Figure 35:
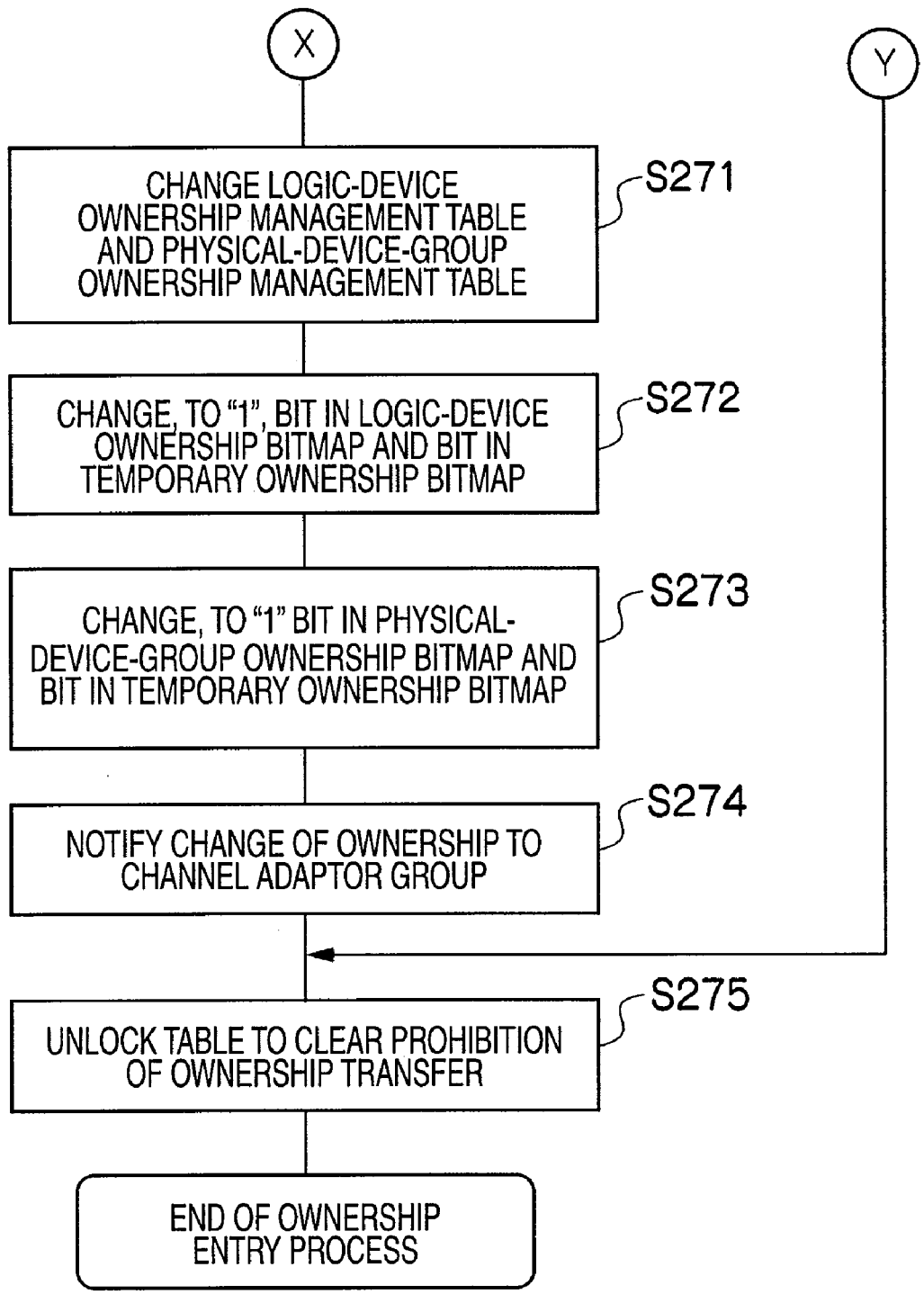
FIG. 35 is another flowchart of the ownership entry process in the embodiment.

5-4. Ownership Process for Eliminating Logic Device or Physical Device Group By referring to the flowchart of FIG. 33, described next is an ownership process for eliminating a logic device LDEV or a physical device group PDEV-G in the storage device 4.

For eliminating a logic device LDEV or a physical device group PDEV-G in the storage device 4, the microprocessor 11 having an ownership with respect to the elimination-target logic device LDEV or physical device group PDEV-G executes the ownership process.

First of all, the CPU 110 of the microprocessor 11 having an ownership with respect to the elimination-target logic device LDEV or physical device group PDEV-G (hereinafter, simply referring to as elimination-target CPU) locks the ownership-transfer lock table 26 to prohibit ownership transfer by adding the number of the microprocessor 11 of its own (S251), and executes the request(s) in the request buffer 15 (S252).

The elimination-target CPU 110 then changes the contents in the ownership-management table (S253). To be specific, when the elimination-target microprocessor 11 has an ownership with respect to the elimination-target logic device, any corresponding portion in the "ownership MPPK#" field 231 of the logic-device ownership-management table 23 and that in the "temporary ownership MPPK#" field 232 thereof are made not-yet-assigned. Moreover, when the elimination-target microprocessor 11 has an ownership with respect to the elimination-target physical device group PDEV-G, any corresponding portion in the "ownership MPPK#" field 241 of the physical-device-group ownership management table 24, and that in the "temporary ownership MPPK#" field 242 thereof are made not-yet-assigned.

Thereafter, the elimination-target microprocessor 11 turns on, to "0", any corresponding bit in the not-yet-assigned logic-device bitmap 27, and that in the not-yet-assigned physical-device-group bitmap 28 (S254), and then unlock the ownership-transfer lock table 26 to clear the prohibition of ownership transfer by eliminating its own number from the table (S255). This is the end of the process.

5-5. Ownership Entry Process

When the storage device 4 executes the above-described ownership process, a not-yet-assigned logic device LDEV and a not-yet-assigned physical device group PDEV-G are formed. If this is the case, none of the microprocessors 11 is allowed to access such not-yet-assigned logic device LDEV and not-yet-assigned physical device group PDEV-G. In consideration thereof, there needs to set these not-yet-assigned logic device LDEV and not-yet-assigned physical device group PDEV-G to be under the ownership of any of the microprocessors 11. By referring to the flowcharts of FIGS.

34 and 35, described now is an ownership entry process. The ownership entry process is executed by each of the microprocessors 11 on a regular basis.

The CPU 110 of an arbitrary microprocessor 11 refers to the microprocessor-operating ratio management table, and determines whether the operating ratio of its own microprocessor 11 is the lowest or not (S261). When the operating ratio of its own microprocessor 11 is the lowest (S261: YES), the CPU 110 of the arbitrary microprocessor 11 locks the ownership-transfer lock table to prohibit ownership transfer by adding the number of its own microprocessor in the table (S262), and then determines whether a bit in the not-yet-assigned logic-device bitmap 27 is not yet assigned or not (S263).

When the not-yet-assigned logic-device bitmap 28 includes any not-yet-assigned logic device (S263: YES), the CPU 110 of the arbitrary microprocessor 11 sets an ownership to the not-yet-assigned logic device (S264). The CPU 110 of the arbitrary microprocessor 11 then searches the logic device group LDEV-G including the ownership-set logic device LDEV for any not-yet-assigned logic-device LDEV. The CPU 110 of the arbitrary microprocessor 11 makes such a search by referring to the logic-device-group management table 25 and the not-yet-assigned logic-device bitmap 27. The CPU 110 of the arbitrary microprocessor 11 then sets an ownership to every not-yet-assigned logic device LDEV found by the search (S265).

Similarly, the CPU 110 of the arbitrary microprocessor 11 makes a search for a physical device group PDEV-G including the ownership-set logic device LDEV. The CPU 110 of the arbitrary microprocessor 11 makes such a search by referring to the ownership-set physical-device-group control information table 21 and the not-yet-assigned physical-device-group bitmap 28. The CPU 110 of the arbitrary microprocessor 11 then sets an ownership to every not-yet-assigned physical device group PDEV-G found by the search (S266), and executes the process of step S269 that will be described later.

In step S263, when there is no not-yet-assigned logic device in the not-yet-assigned logic-device bitmap (S263: NO), the CPU 110 of the arbitrary microprocessor 11 determines whether a bit in the not-yet-assigned physical-device-group bitmap 28 is not yet assigned (S267). When there is any not-yet-assigned physical device group PDEV-G in the not-yet-assigned physical-device-group bitmap 28 (S267: YES), the CPU 110 of the arbitrary microprocessor 11 sets an ownership with respect to the not-yet-assigned physical device group PDEV-G (S268), and executes the process of step S269 that will be described later. Note that when there is no not-yet-assigned physical device group PDEV-G in the not-yet-assigned physical-device-group bitmap 28 (S267: NO), the CPU 110 of the arbitrary microprocessor 11 executes the process of step S269 that will be described later.

Thereafter, after setting the ownership (S269: YES), the CPU 110 of the arbitrary microprocessor 11 changes, to "0", the ownership-set bit in the not-yet-assigned logic-device bitmap 27 and that in the not-yet-assigned physical-device-group bitmap 28 (S270). Moreover, the CPU 110 of the arbitrary microprocessor 11 adds the number of its own microprocessor in the logic-device ownership management table 23, i.e., in the "ownership MPPK#" field 231, and the "temporary ownership MPPK#" field 232, and in the physical-device-group ownership management table 24, i.e., in the "ownership MPPK#" field 241 and the "temporary ownership MPPK#" field 242 (S271).

The CPU 110 of the arbitrary microprocessor 11 changes, to "1", the ownership-set bit in the bitmaps on the local memory 111, i.e., in the logic-device ownership bitmap 16, the logic-device temporary ownership bitmap 17, the physical-device-group ownership bitmap 18, and the physical-device-group temporary ownership bitmap 19 (S272 and S273).

Moreover, when there is any ownership-set logic device under the management of the channel adaptor group, the CPU 110 of the arbitrary microprocessor 11 transmits a notification about the change of logic device LDEV to the channel adaptor group (S274).

Thereafter, the CPU 110 of the arbitrary microprocessor 11 unlocks ownership-transfer lock table 26 to clear the prohibition of ownership transfer by eliminating the number of its own microprocessor from the table (S275), and this is the end of this process.

Note that, in step S269, when setting no ownership (S269: NO), the CPU 110 of the arbitrary microprocessor 11 unlocks the ownership-transfer lock table 26 to clear the prohibition of ownership transfer by eliminating the number of its own microprocessor from the table (S275), and this is the end of this process.

5. Effect of Embodiment

As described above, in the embodiment, ownership transfer can be performed with a consideration given to communications possibly required between the microprocessors as a result of ownership transfer. Moreover, in the embodiment, ownership transfer can be performed with a consideration given not only to the load of logic devices under the management of a storage device but also to the load of management units other than the logic devices. As such, the load to be imposed on a transfer-source microprocessor can be distributed to allow easy management also by a transfer-destination microprocessor, thereby making full use of the performance capabilities of the storage device.

According to the aspects of the invention, the load to be imposed on a plurality of microprocessors can be distributed, and a consideration is given to the correlation between various factors of the storage device, thereby making full use of the performance capabilities of the storage device.

Moreover, the ownership transfer can be performed with a consideration given to communications possibly required between the microprocessors as a result of the ownership transfer. The ownership transfer can be also performed with a consideration given not only to the load of logic devices but also to the load of storage areas other than the logic devices.

The invention is widely applicable to a storage system including one or more storage devices, and a storage system of any other configuration.

What is claimed is:

1. A storage system, comprising:
a plurality of microprocessors;
a plurality of storage areas to be formed to a drive group configured by a plurality of physical drives;
an assignment section that assigns, to each of the microprocessors, an ownership of accessing any of the storage areas;
a management section that manages, as an operating ratio, a proportion of a time to be taken for each of the microprocessors to execute a request issued to each of the storage areas;
a search section that searches, for transferring the ownership assigned to an arbitrary microprocessor to another microprocessor determined based on the operating ratio, one or more of the storage areas under the ownership of the arbitrary microprocessor for a transfer-target storage area; and a transfer section that transfers, to the other microprocessor, the ownership corresponding to the transfer-target storage area.

2. The storage system according to claim 1, wherein the search section calculates a reference operating ratio for use as a reference for ownership transfer, and searches for the transfer-target storage area based on the reference operating ratio.

3. The storage system according to claim 1, wherein the storage areas each have a different storage capacity, and the search section determines whether to transfer, to the other microprocessor, the ownership(s) corresponding to a combination of an ownership of one or more physical drive groups configured by the physical drives, and an ownership of one or more logic devices configured by a storage area of the one or more physical device groups.

4. The storage system according to claim 1, wherein the request varies in type, and on a request type basis, the storage areas are classified into groups.

5. The storage system according to claim 1, wherein the search section determines any of the microprocessors showing a smallest value of the operating ratio as the another microprocessor.

6. An ownership transfer method, comprising the steps of:

assigning, to each of a plurality of microprocessors, an ownership of accessing any of a plurality of storage areas formed to a drive group configured by a plurality of physical drives;

managing, as an operating ratio, a proportion of a time to be taken for each of the microprocessors to execute a request issued to each of the storage areas;

searching, for transferring the ownership assigned to an arbitrary microprocessor to another microprocessor determined based on the operating ratio, one or more of the storage areas under the ownership of the arbitrary microprocessor for a transfer-target storage area; and transferring, to the another microprocessor, the ownership corresponding to transfer-target storage area.

7. The ownership transfer method according to claim 6, wherein in the searching step, a reference operating ratio is calculated for use as a reference for ownership transfer, and the transfer-target storage area is searched for based on the reference operating ratio.

8. The ownership transfer method according to claim 6, wherein the storage areas each have a different storage capacity, and in the searching step, a determination is made whether to transfer, to the other microprocessor, the ownership(s) corresponding to a combination of an ownership of one or more physical drive groups configured by the physical drives, and an ownership of one or more logic devices configured by a storage area of the one or more physical device groups.

9. The ownership transfer method according to claim 6, wherein the request varies in type, and on a request type basis, the storage areas are classified into groups.

10. The ownership transfer method according to claim 6, wherein in the searching step, any of the microprocessors showing a smallest value of the operating ratio is determined as the another microprocessor.

* * * * *